United States Patent
Corbett et al.

(10) Patent No.: US 11,112,342 B2
(45) Date of Patent: Sep. 7, 2021

(54) PARTICLE CHARACTERISATION INSTRUMENT

(71) Applicant: Malvern Panalytical Limited, Malvern (GB)

(72) Inventors: Jason Corbett, Malvern (GB); Richard Scullion, Malvern (GB)

(73) Assignee: Malvern Panalytical Limited, Malvern (GB)

( * ) Notice: Subject to any disclaimer, the term of this patent is extended or adjusted under 35 U.S.C. 154(b) by 0 days.

(21) Appl. No.: 16/340,881

(22) PCT Filed: Sep. 22, 2017

(86) PCT No.: PCT/EP2017/074094
§ 371 (c)(1),
(2) Date: Apr. 10, 2019

(87) PCT Pub. No.: WO2018/069024
PCT Pub. Date: Apr. 19, 2018

(65) Prior Publication Data
US 2019/0234852 A1      Aug. 1, 2019

(30) Foreign Application Priority Data
Oct. 11, 2016 (EP) ..................................... 16193377

(51) Int. Cl.
*G01N 15/02* (2006.01)
*G01N 21/49* (2006.01)
(Continued)

(52) U.S. Cl.
CPC ..... *G01N 15/0211* (2013.01); *G01N 15/1434* (2013.01); *G01N 15/1456* (2013.01);
(Continued)

(58) Field of Classification Search
CPC ............ G01N 15/0211; G01N 15/1434; G01N 15/1456; G01N 21/49; G01N 2015/0222;
(Continued)

(56) References Cited

U.S. PATENT DOCUMENTS 5,684,585 A * 11/1997 Girvin ................ G01N 15/1012
356/243.1
2003/0030803 A1    2/2003 Kusuzawa
(Continued)

FOREIGN PATENT DOCUMENTS

CN         103959039 A     7/2014
WO         2010/100502 A1  9/2010

OTHER PUBLICATIONS

International Search Report and Written Opinion dated Mar. 5, 2018, directed to International Application No. PCT/EP2017/074094; 15 pages.
(Continued)

*Primary Examiner* — Jonathan M Hansen
(74) *Attorney, Agent, or Firm* — Morrison & Foerster LLP

(57) ABSTRACT

A particle characterisation instrument, comprising a light source, a sample cell, an optical element between the light source and sample cell and a detector. The optical element is configured to modify light from the light source to create a modified beam, the modified beam: a) interfering with itself to create an effective beam in the sample cell along an illumination axis and b) diverging in the far field to produce a dark region along the illumination axis that is substantially not illuminated at a distance from the sample cell. The detector is at the distance from the sample cell, and is configured to detect light scattered from the effective beam by a sample in the sample cell, the detector positioned to detect forward or back scattered light along a scattering axis that is at an angle of 0° to 10° from the illumination axis.

22 Claims, 18 Drawing Sheets

(51) Int. Cl.
*G01N 15/14* (2006.01)
*G01N 21/47* (2006.01)

(52) U.S. Cl.
CPC ..... *G01N 21/49* (2013.01); *G01N 2015/0222* (2013.01); *G01N 2015/1454* (2013.01); *G01N 2021/4707* (2013.01); *G01N 2021/4709* (2013.01); *G01N 2201/063* (2013.01); *G01N 2201/0635* (2013.01)

(58) Field of Classification Search
CPC ... G01N 2015/1454; G01N 2021/4707; G01N 2021/4709
See application file for complete search history.

(56) References Cited

U.S. PATENT DOCUMENTS

| | | | |
|---|---|---|---|
| 2005/0264809 A1* | 12/2005 | Myers | G01N 21/53 356/338 |
| 2010/0315635 A1 | 12/2010 | Janzen et al. | |
| 2014/0192355 A1 | 7/2014 | Froigneux et al. | |
| 2014/0226158 A1* | 8/2014 | Trainer | G02B 6/32 356/336 |
| 2016/0202164 A1* | 7/2016 | Trainer | G01N 15/0211 |

OTHER PUBLICATIONS

Berne et al. (2000). Dynamic Light Scattering: With Applications to Chemistry, Biology, and Physics. A Wiley-Interscience Publication, 375 pages.

Koppel. (1972). "Analysis of Macromolecular Polydispersity in Intensity Correlation Spectroscopy: The Method of Cumulants," J. Chem. Phys. 57(11); 4814-4820.

Maret et al. (1987). "Multiple Light Scattering from Disordered Media.The Effect of Brownian Motion of Scatterers," Z. Phys. B Condensed Matter 65: 409-413.

Static Light Scattering Technologies for GPC/SEC Explained (2013), Malvern Instruments Limited white paper; 28 pages.

Zhu et al. (2010). "Nonnegative least-squares truncated singular value decomposition to particle size distribution inversion from dynamic light scattering data," Applied Optics 49(34): 6591-6596.

First Office Action dated Jan. 28, 2021, directed to CN Application No. 201780062043.4; 14 pages.

* cited by examiner

PARTICLE CHARACTERISATION INSTRUMENT

REFERENCE TO RELATED APPLICATIONS

This application is a national stage application under 35 USC 371 of International Application No. PCT/EP2017/074094, filed Sep. 22, 2017, which claims the priority of European Application No. 16193377.5, filed Oct. 11, 2016, the entire contents of each of which are incorporated herein by reference.

FIELD OF THE INVENTION

The invention relates to an instrument for characterising particles, particularly to an instrument for characterising particles by detecting light scattered from a sample containing the particles.

BACKGROUND OF THE INVENTION

The scattering of light by a sample is used in various experimental techniques to determine properties of the particles in the sample. For example, electrophoretic light scattering, dynamic light scattering, depolarised dynamic light scattering, and static light scattering can all be used to extract properties of particles such as particle shape, particle size distribution, or molecular weight.

Typically, such experiments involve illuminating a sample with a light source, and detecting the intensity of light that is scattered from the sample at a well-defined detection angle. The scattering angle is measured with reference to the direction of the illuminating light beam, which defines a zero axis, which may be also be referred to as an illumination axis, from which the angle of scattering can be measured.

For some applications, it is desirable to measure light that is scattered at low angles (e.g. <10° to the illumination axis). Detecting scattered light at low angles can be difficult. The illuminating light beam continues through the sample along the illumination axis. Separating scattered light from the incident light can be challenging, particularly if the wavelengths and polarisations of the incident and scattered light are the same. As a result, low angle techniques such as low angle light scattering (LALS) detect light scattered at non-zero angles and assume that the intensity of the scattered light at small non-zero angles is the same as that of the zero angle scattered light (i.e. light scattered from the sample along the illumination axis in the direction of propagation of the illuminating light beam). Such assumptions limit the accuracy of the particle characteristics determined from these measurements.

The illuminating light also limits detection of back scattered light. Light scattered at or near 180° from the illumination axis ("π scattered light") is coincident with the incoming incident light. Not only does the incident light make isolating scatter difficult, but positioning a detector to measure scatter risks obscuring the incident light.

SUMMARY OF THE INVENTION

In accordance with a first aspect of the invention there is provided a particle characterisation instrument, comprising: a light source; a sample carrier defining a sample position; an optical element between the light source and sample carrier, the optical element configured to modify light from the light source to create a modified beam, the modified beam: a) interfering with itself to create an effective beam at the sample position; and b) diverging in the far field to produce a dark region along the illumination axis that is substantially not illuminated at a distance from the sample position; and a detector, at the distance from the sample position, configured to detect light scattered from the effective beam by a sample at the sample position, the detector positioned to detect forward or back scattered light along a scattering axis that is at an angle of 0° to 10° from the illumination axis.

The sample carrier may comprise a droplet surface for holding a droplet or liquid sample. The sample carrier may comprise a cell or a cuvette or a sample mount for mounting a sample. The sample position may be a fixed point, or may be a volume, for example the sample volume of a cuvette.

In accordance with a second aspect of the invention there is provided a particle characterisation instrument, comprising: a light source; a sample cell; an optical element between the light source and sample cell, the optical element configured to modify light from the light source to create a modified beam, the modified beam: a) interfering with itself to create an effective beam in the sample cell propagating along an illumination axis and b) diverging in the far field to produce a dark region along the illumination axis that is substantially not illuminated at a distance from the sample cell; and a detector, at the distance from the sample cell, configured to detect light scattered from the effective beam by a sample in the sample cell, the detector positioned to detect forward or back scattered light along a scattering axis that is at an angle of 0° to 10° from the illumination axis.

The sample cell may comprise a droplet surface for holding a droplet or liquid sample. The sample cell may comprise a cuvette. The sample cell may define a sample position. The sample position may be a fixed point, or may be a volume, for example the sample volume of a cuvette.

Such instruments can be used to measure zero- and/or π-angle scattered light. The effective beam therefore acts as the incident light of a conventional scattering instrument, illuminating a sample along a zero axis, so that light is scattered by a sample. Unlike in a conventional instrument, the modified beam creates a dark region along the illumination (i.e. zero) axis. Light scattered by the sample at the zero angle (0 to the illumination axis) or low angles will travel along the illumination axis into the dark region, where it can be detected substantially in the absence of the modified beam. Similarly, back scattered light, or light scatted at angles close to 180°, can be detected in a dark region of the modified beam before the sample cell.

Substantially not illuminated means dark enough that the ratio of light intensity in the dark region to the light intensity in the brightest region at the distance is less than 10-6 (or less than $10^{-5}$, or $10^{-5}$, or $10^{-4}$).

Modifying the light may comprise diffracting, refracting, obscuring (e.g. with an opaque disc or aperture), reflecting (e.g. with a curved surface, which may also comprise an aperture), or some combination of these effects.

The light source may be a laser. The light source may provide light with a wavelength in the range of 280 nm to 2000 nm.

The instrument may be an imaging system—i.e. where an image is formed within the sample cell/at the sample position, such as an image of the light source or an entrance or exit pupil or any other part of the instrument; or may be a non-imaging system—i.e. where an image is not formed in the sample cell/at the sample position, for example a system which uses focused or collimated laser beams as the light source, or focused or collimated optical fibre detection paths.

The illumination axis may be parallel to and/or coincident with an axis of incidence of light from the light source.

The detector may be a first detector positioned to detect forward scattered light, and the instrument may further comprise a second detector positioned to detect back scattered light. Such examples may be capable of detecting zero-angle and π-angle scattered light simultaneously. Alternatively, the or a detector of the instrument may be positionable to detect light either at zero-angle (or within 10° of zero-angle) or at π-angle (or within 10° of π-angle).

In some embodiments of either the first or second aspect, the detector may comprise an active detector area. The position of the detector may be with reference to a centroid of the active detector area. The active detector area may be located entirely within the dark region. For example, none of the modified beam may be received by the active detector area, or only a negligible amount of the modified beam may be received by the active detector area. An amount of the modified beam may be considered negligible if the ratio of its intensity in the dark region to the modified beam intensity in the brightest region at the distance from the sample cell is less than $10^{-6}$.

The detector may detect scattered light by direct detection of scattered light, or may use a heterodyne or homodyne detection scheme. The instrument may comprise a reference beam for heterodyne or homodyne detection, the reference beam may be mixed with the scattered light before (or at) the detector.

In some embodiments of either the first or second aspects, the instrument may comprise a plurality of detectors, each detector at the distance from the sample position, and configured to detect light scattered from the effective beam by a sample at the sample position, the detector positioned to detect forward or back scattered light along a scattering axis that is at an angle of 0° to 10° from the illumination axis. In particular, each of the plurality of detectors may be configured to detect forward scattered light; or each of the plurality of detectors may be configured to detect back scattered light. One or more detectors of the plurality of detectors may be positioned to detect light along a different scattering axis to the other detectors of the plurality of detectors. For example, a first detector of the plurality of detectors may be positioned to detect light along a scattering axis that is at a first angle from the illumination axis, and a second detector of the plurality of detectors may be positioned to detect light along a scattering axis that is at a second angle from the illumination axis, each of the first and second angles being within the range 0° to 10° from the illumination axis. The first angle may be in a first direction (e.g. clockwise) from the illumination axis, and the second angle may be in a second direction (e.g. anti-clockwise) from the illumination axis. In such cases, the size of the first angle may equal the size of the second angle. Both the first and second angles may be in the same direction from the illumination axis (e.g. clockwise), but the size of the first angle may be different to the size of the second angle. The plurality of detectors may comprise any number of detectors, for example two, three, four, or five detectors. By such arrangements, two or more detectors may be positioned to receive light scattered at near-zero angles. The instrument may be configured to compare the signal received by the at least two detectors to estimate the zero-angle signal.

The detector or detectors of any embodiment may be configured to detect scattered light within a range of angles. For example, the detector or detectors may be configured to detect light within a 1° or 2° or 3° or 4° or 5° range. For example, the detector or detectors may be configured to detect light scattered within a range of angles from a desired angle, e.g. a range extending ±0.5° or ±1° or ±1.5° or ±2° or ±2.5° from the desired angle. The desired angle may be 0° or any angle between 0° and 10° from the illumination axis. The range of angles detected may correspond to angle of scattered light subtended by the active detector area of the detector. Where the scattered light is coupled to a detector by an optical fibre, the range of angles detected may correspond to the angle of scattered light subtended by the optical fibre inlet.

In some embodiments, the effective beam may approximate a plane wave travelling along the illumination axis, or a plane wave travelling along the illumination axis with an Airy disc intensity profile. For example, the intensity profile of the effective beam may comprise a central intensity peak at the centre of the effective beam, and secondary intensity peaks at a distance from the centre of the effective beam. The secondary intensity peaks may for example have an intensity no greater than 10% of the intensity of the central intensity peak.

Intensity profile, as used herein, means the intensity of light at a particular distance along the beam as a function of position across a cross-section of the beam at that distance.

The effective beam may approximate a plane wave. In particular, the effective beam may be planar across the sample cell/sample position, or across a portion of the sample cell/sample position. In some embodiments, the effective beam may approximate a Bessel beam.

In some embodiments, the optical element may be or comprise an axicon lens—i.e. a lens with a conical surface. The light source may for example be configured to provide light comprising plane waves to the axicon lens. The axicon lens may for example modify the light such that the light comes to a focus in the sample cell/at the sample position, forming an effective beam in the sample cell/at the sample position that approximates a Bessel beam; and such that the modified beam away from the sample cell/sample position forms a ring centred on the illumination axis with the dark region inside the ring.

In some embodiments, the optical element may be or comprise an obscured lens, the obscured lens comprising a refracting element and a light-blocking obscuration element positioned to block light along an optical axis of the refracting element. The refracting element may be a lens, such as a plano-convex or biconvex lens. The obscuration element may be a mask, coating, or sticker placed on the lens, or a physical object placed adjacent to the lens. For example, a material may be coated onto the lens by adhering, spraying, plating, or vapour deposition. The obscuration element may comprise a metal, such as copper. The obscuration element may be between 80% and 100% opaque to light at wavelengths emitted by the light source, and preferably between 95% and 100% opaque to light at such wavelengths. The size of the obscuration element may defined with reference to a diameter of obscured lens The obscuration element may have a diameter of between 0.01 and 0.7 times that of the obscured lens, or between 0.1 and 0.4 times the diameter of the obscured lens.

The obscured lens may modify light from the light source such that the light comes to a focus in the sample cell/at the sample position, forming an effective beam in the sample cell/at the sample position that comprises an intensity profile approximating an Airy disc profile; and such that the modified beam away from the sample cell/sample position forms a ring centred on the illumination axis with the dark region inside the ring.

The obscuration element may for example be a detector, such as the detector or second detector positioned to detect back scattered light.

In some examples, the lens may comprise an aperture through its centre; the detector or second detector positioned to detect back scattered light may be positioned within the aperture.

In some examples, the optical element may comprise: a beam splitter configured to split light from the light source into a first portion and a second portion; and at least one lens positioned to receive the first portion and the second portion. The at least one lens may be configured to direct the first portion and the second portion onto the sample cell/the sample position. Alternatively the light source may be a first light source, and the instrument may comprise a second light source, configured to produce light that is coherently related to the light of the first light source. Light from the first light source may act as the first portion, and light from the second light source may act as the second portion.

In such arrangements, the at least one lens may modify light from the light source/s by focusing the first and second portions of light onto the sample cell/sample position, forming an effective beam in the sample cell/sample position that comprises an intensity profile approximating an Airy disc profile. Away from the sample cell/sample position, the first and second portions diverge, producing a dark region between the two portions.

The optical element may further comprise at least one mirror arranged to re-direct the first or second portion so that the first portion and second portion travel along parallel directions when incident upon the at least one lens.

The beam splitter may be configured such that the intensity of the first portion and/or second portion is between 40% and 60% of the intensity of the light emitted by the light source. Preferably, the intensity of the first portion is equal to, or within 5% of, the intensity of the second portion.

In some examples, the at least one lens may comprise two lenses, each lens positioned to receive only one of the first portion and second portion, and to direct that portion onto the sample cell/sample position.

In alternative examples, a single lens may be positioned to receive both portions of the light from the light source, and the single lens may be configured to direct both portions of light onto the sample cell/sample position.

In such examples, the single lens may be positioned such that the first portion and second portion are incident at opposing positions on the lens relative to the optical axis of the lens. For example, the single lens may comprise a central optical axis passing through the centre of the lens and the focal point of the lens. The single lens may be configured such that, after refraction by the lens: a Poynting vector of a first portion of the two portions of light has a first component perpendicular to the optical axis of the lens; and a Poynting vector of a second portion of the two portions of light has a second component perpendicular to the optical axis of the lens; wherein the first component and second component sum to zero.

In some examples the instrument may further comprises a light blocker such as a beam dump operable to block one of the portions of light. The unblocked portion of light may then be used to illuminate the sample cell/sample position so that a conventional high-angle (i.e. >10° from the illumination axis) scattering measurement can be taken.

In any of the example instruments previously described, the instrument may further comprise a light deflecting element, for example a mirror, configured to deflect light scattered along the scattering axis to the detector.

For example, the detector may be located away from the illumination (zero-) axis. The light deflecting element can be used to deflect light that has been scattered at angles in the range of 0-10° towards the detector. In particular examples, the detector may be positioned at an angle of between 15° and 20° to the illumination axis. The light deflecting element can be used to deflect zero- or low angle scatter to such a detector. The detector itself may be in a dark region bounded by the modified beam, or may be located in a region beyond the modified beam.

Any of the example instruments described above may comprise a rotary attenuator. The rotary attenuator may be positioned between the light source and sample carrier, for example between the light source and optical element or between the optical element and sample carrier. The rotary attenuator may be positioned between the sample carrier and the detector or one or more detectors.

One aspect of the invention comprises an optical assembly for adapting an instrument to detect light scattered at zero degrees to an illumination axis, comprising: a body, which may be configured to be received in a cuvette holder, configured to house a liquid sample, enabling illuminating light from outside the body to communicate with the sample and scattered light to communicate from the sample to outside the body; an optical element (such as an axicon, or an obscured lens) attached to the body, configured to modify light from a light source to create a modified beam, the modified beam: a) interfering with itself to create an effective beam in the body propagating along an illumination axis and b) diverging in the far field to produce a dark region along the illumination axis that is substantially not illuminated at a distance from the sample cell/sample position.

A light deflecting element may be provided, attached to the body, and positioned in the dark region. The light deflecting element may be configured to divert light scattered from the liquid sample in the direction the illumination axis along an axis that is at a non-zero angle to the illumination axis.

The body may be configured to be received in an optical instrument comprising a light source and a detector (e.g. as described in relation to other embodiments). The body may be at least partially transparent. The body, including the optical element, sample cell (or sample carrier) and light deflecting element may be removed from and replaced into the optical instrument. The body may be configured to be received by a sample holder of the optical instrument, for example a cuvette holder. The instrument may further comprise a cuvette that is configured to be received by the same sample holder.

The body may be configured as a sample holder, for holding a liquid. The body may be configured to hold a sample holder, such as a capillary, or a cuvette with smaller external dimensions than the body. The body may comprise alignment features for accurately aligning a sample holder within the body.

Such arrangements may be particularly useful when retrofitting an existing system to add zero-angle measurement capability. The existing instrument may have a detector positioned to receive conventional "low-angle" scatter, for example light scattered at around 17° from the illumination axis. The light deflecting element may added to the existing instrument to direct zero-angle scattered light (or light scattered between 0 and 10° from the illumination axis)

towards the existing detector. By placing the optical element, sample cell (or sample carrier), and light deflecting element on a supporting body, these elements can be inserted and removed from an existing system as required. For example, an existing system which comprises a light source and a detector can be temporarily retrofitted to enable zero-angle and low-angle scatter measurements to be taken.

In alternative examples, the light deflecting element may be omitted from the body. Zero- and low-angle scattered light may then be detected by a detector within the dark region, as described above.

One aspect of the invention comprises a non-volatile machine readable medium comprising a computer program configured to operate an optical instrument, the instrument comprising a light source for illuminating a sample position along an illumination axis and a detector configured to detect light scattered away from the illumination axis by a sample at the sample position. The computer program is configured to determine if an optical assembly is present in the instrument. If the program determines that the optical assembly is not present, the program operates in a first mode for performing an off-axis scattering measurement; and if the program determines that the optical assembly is present, the program operates in a second mode for performing a zero-angle scattering measurement.

When the optical instrument is not present, the computer program operates the optical instrument in a conventional manner, for example operating the light source to illuminate a sample and operating the detector to detect light that has been scattered at 17° to the illumination axis (or some other angle corresponding with the measurement setup). When the optical instrument is present, the computer program modifies the operation of the optical instrument to perform a zero-angle scattering measurement. In effect, in the second mode the computer program operates the optical instrument as if it was a particle characterisation instrument as described above. For example the computer program may reinterpret any measurements received from the detector to identify the measurements as light scattered at zero-angle.

One aspect of the invention comprises a computer program for calculating a physical property of a sample in a sample cell (or at a sample position) of an optical instrument, the instrument comprising a light source for illuminating the sample along an illumination axis and a detector positioned to detect light scattered by the sample along an axis that is at a first angle to the illumination axis; wherein the computer program is configured to determine if an optical assembly is present in the instrument, and wherein: if the program determines that the optical assembly is not present the program is configured to determine the physical property by performing a calculation based on a scattering angle at the first angle; and if the program determines that the optical assembly is present the program is configured to determine the physical property by performing a calculation based on a zero-angle scattering angle.

Calculating the physical property may comprise performing an electrophoretic light scattering calculation, a dynamic light scattering calculation, a depolarised dynamic light scattering calculation, and/or a static light scattering calculation. The physical property may include at least one of particle shape, particle size, (e.g. particle size distribution), and molecular weight.

When the optical assembly is not present, the light detected by the detector is that scattered at the first angle. The computer program therefore uses the first angle as the scattering angle when calculating the physical properties.

When the optical assembly is present, the light detected by the detector is the zero-angle scattered light, which has been redirected to the off-axis detector of the instrument by the assembly. The computer program therefore performs the calculation using zero as the scattering angle.

Determining if an optical assembly is present in the instrument may comprise checking a user controllable variable that indicates whether the optical assembly is being used. Alternatively or additionally, the output from a sensor may be used to detect when the optical assembly is being used.

The computer programs described above may be provided on hardware associated with the optical instrument, or may be stored in the memory of any computing device, or provided on a computer readable medium, which may be a physical computer readable medium, such as a disc or a memory device, or may be embodied as a transient signal. Such a transient signal may be a network download, including an internet download.

In any of the example instruments described above, the instrument may further comprise an additional detector configured to detect light scattered from the effective beam by a sample in the sample cell/at the sample position. For example, the additional detector may be positioned or be positionable to detect scattered light along a scattering axis that is at an angle of 85° to 95° from the illumination axis ("side-scattered" light). Alternatively the additional detector may be positioned or be positionable to measure light scattered at any other angles. The additional detector may for example allow measurements of side-scattered light to be taken simultaneously with measurements of zero-angle and/or π-angle scattered light. Simultaneous measurements of light scattered at multiple angles, particularly of light scattered along two orthogonal directions, may provide increased capability or accuracy when extracting particle properties from the measurements. Measurements at multiple angles may also be taken sequentially.

In some examples of any of the example instruments described above, the instrument may further comprise a beam expander arranged to increase the beam width of light from the light source before the light is incident upon the optical element. Expanding the beam may be necessary to ensure sufficient light passes through the optical element to successfully illuminate the sample cell/sample position. For example, the beam may be expanded to increase the proportion of incident light passing around the obscuration element.

The instrument may comprise a processor, configured to determine characteristics of particles from an output of the detector. The instrument may be configured to perform an electrophoretic light scattering measurement, a dynamic light scattering measurement, a depolarised dynamic light scattering measurement, and/or a static light scattering measurement. The characteristics may include at least one of particle shape, particle size distribution, and molecular weight.

The instrument may comprise a sample flowing system for flowing sample into the sample cell/sample carrier. The instrument may comprise a chromatography system, auto-titrator system, auto-dosing system and/or an auto-sampling system.

In some examples, the detector may comprise an optical filtering arrangement, the optical filtering arrangement comprising a lens and an aperture. For example the aperture may be a confocal stop or a field stop, or some combination of the two. Where the instrument comprises an imaging system, for example, the optical filtering arrangement may be used to filter scattered light that has not been scattered from an image in an image plane in the sample cell/at the sample position, before that light reaches an optical sensor. The detector may comprise an optical fibre. Scattered light may be coupled into the optical fibre after being filtered by the optical filtering arrangement.

In any of the examples described above, the optical element (or a part of it) may be movable along the optical or illumination axis. For example the obscured lens or axicon lens may be movable along its optical axis. Alternatively or additionally, any of the above examples may comprise an additional lens (e.g. a non-invasive backscatter (NIBS) lens) between the optical element and the sample cell/sample position. The additional lens may be movable, for example along its optical axis or the illumination axis. The moveable optical element and/or additional lens may allow the location of the focus of the modified beam in the sample cell/at the sample position to be adjusted. For example if the sample to be measured is dilute or comprises small particles, the focus may ideally be located near the centre of the sample cell/sample position. If the sample is more concentrated, the focus may ideally be located nearer to the edge of the sample cell/sample position that is closest to the optical element.

According to a further aspect of the invention there is provided a method of characterising particles dispersed in a sample, the method comprising: placing the sample in a sample cell (or at the sample position of a sample carrier); providing a light source to illuminate the sample cell (or sample position); modifying light from the light source to create a modified beam, the modified beam interfering with itself to create an effective beam in the sample cell (or at the sample position) along an illumination axis and diverging in the far field to produce a dark region along the illumination axis that is substantially not illuminated at a distance from the sample cell (or sample position); detecting light that is forward or back scattered from the sample along a scattering axis that is at an angle of 0° to 10° from the illumination axis.

Modifying light from the light source may comprise using an optical element placed between the light source and the sample cell (or sample position), the optical element configured to modify light from the light source to create the modified beam.

Detecting light may comprise using a detector placed at the distance from the sample cell (or sample position).

The optical element may comprise any optical element described above in relation to the first aspect and/or second aspects. Any feature of any aspect may be used with any feature of any other aspect.

In some examples, the detector may comprise an active detector area, and the method may comprise locating the active detector area entirely within the dark region.

BRIEF DESCRIPTION OF THE DRAWINGS

The invention is described in further detail below by way of example and with reference to the accompanying drawings, in which:

FIG. 5b shows the intensity profile of the modified beam produced by the optical element in FIG. 5a;

FIG. 6b shows the intensity profile of the modified beam produced by the optical element in FIG. 6a;

FIG. 6c shows an alternative arrangement of the optical element of FIG. 6a;

DETAILED DESCRIPTION OF THE INVENTION

Figure 1:
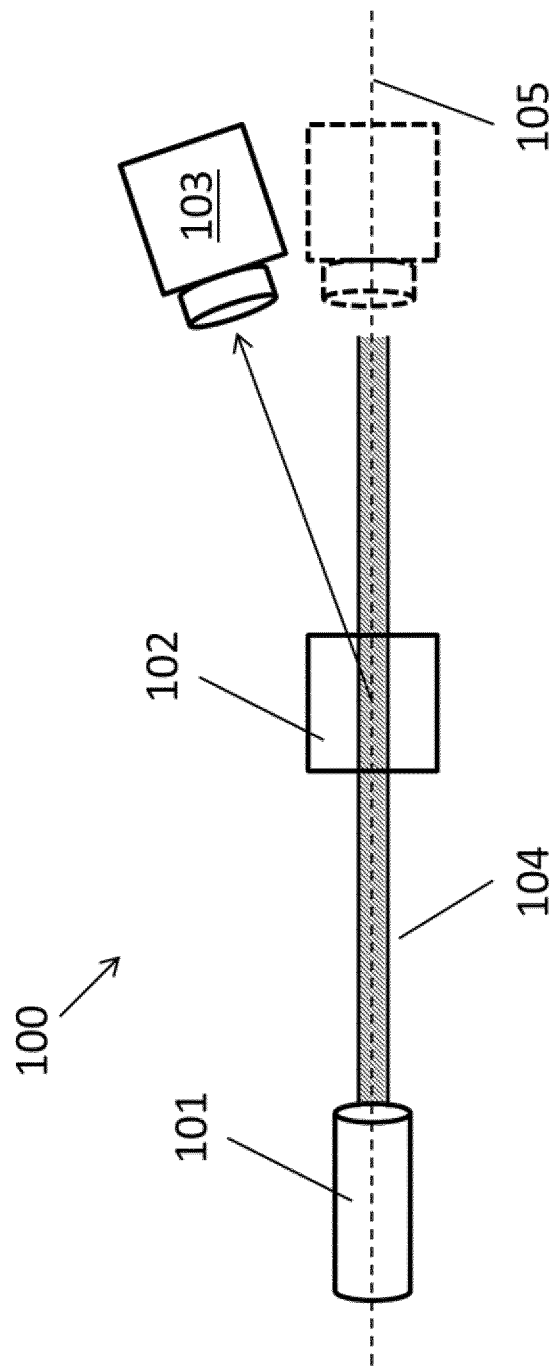
FIG. 1 is a schematic representation of a conventional scattering experiment.

FIG. 1 shows a conventional scattering instrument 100. The conventional instrument comprises a light source 101, sample cell 102, and detector 103. The light source 101 is configured to emit an illuminating light beam 104 along an illumination axis 105. The sample cell lies on the illumination axis 105. Light beam 104 illuminates a sample in the sample cell. Some of the light beam 104 is scattered from particles in the sample. The detector is positioned to detect scattered light (represented by the arrow in FIG. 1).

In other embodiments, the instrument may comprise any sample carrier defining a sample point, for example a droplet surface, cuvette, or sample mount. In the description below, only a sample cell has been described, but it is to be understood that in any described example the sample cell may be replaced with any form of sample carrier, with the modified beam used to illuminate the sample position of that sample carrier.

In most cases, the sample cell 102 and sample are substantially transparent to the incident light 104—only a small fraction of the light is scattered. Most of light 104 therefore continues to travel along the illumination axis 105 after passing through the sample cell 102. The intensity of the light 104 is much larger than that of any scattered light. If detector 103 was placed on the illumination axis 105 (in the position illustrated by the dotted detector in FIG. 1), the detection signal would be dominated by the illuminating light beam 104. Determining which part of the detected signal was due to zero-angle scattered light would be very difficult, if not impossible. As a result, conventional instruments such as instrument 100 do not measure zero-angle scattered light. Instead, detector 103 may be placed at as low an angle to the illumination axis 105 as possible whilst avoiding receiving the illuminating light beam 104 at the detector. For example, in the Zetasizer instrument produced by Malvern Instruments, the detector is placed at an angle of 17° to the illumination axis 105.

Although not possible with conventional equipment, measuring light scattered at very low angles close to zero angle, and even at zero angle itself, would be desirable. Possible uses of low-angle or zero-angle measurements for characterising particles are described below.

In a general light scattering model, collimated light enters and is scattered by a sample from well-defined angles of entry and exit. The entire experimental apparatus is elegantly described by the q-vector, where, $$|q| = \frac{4\pi}{\lambda}\sin\left(\frac{\theta}{2}\right) \qquad (1)$$

and λ, is the wavelength of the illuminating light in air.

Electrophoretic Light Scattering

Near to zero scattering, the Diffusional component, $D_T\alpha|q|^2$ is suppressed, allowing more accurate measurement of the electrophoretic mobility, $\varnothing=|q|\mu E$ of very small particles. This leads to an improvement in the accuracy and precision of zeta potential measurements, particularly for polydisperse or multi-modal zeta potential distributions[1]. The application space for this is large and may include of proteins, lipids, nano-colloids of all types.

Dynamic Light Scattering

The optical broadening of the DLS signal, with characteristic width, $|q|\times D_T$ is clearly angle dependent, from Eq. (1) and this forms a limitation on the resolution with which the modes of multi-modal samples can be resolved. Measuring at or near to zero-angle may increase in the resolution of multimodal DLS reductions, such as NNLS (non-negative least squares)[2].

Conversely, dynamic light scattering requires the assumption of single scattered light in order to accurately fit the correlogram with models such as Cumulants[3] and NNLS. However, as the backscatter angle is approached, the relaxation times of the higher order scattering approaches that of the singly scattered light[4]. The accuracy of this approximation improves as: the angle between the illuminating laser and the detection path approaches zero; the sample concentration approaches the dilute limit; and as the detection position within the sample (the intersection of the illuminating and detected light paths) approaches the wall of the sample cell.

Static Light Scattering

Generally, the Rayleigh equation is used to describe static light scattering[1,5], $$\frac{KC}{R_\theta} = \left(\frac{1}{M_W} + 2A_2C\right)\frac{1}{P_\theta} \qquad (2)$$

where C is the sample concentration, θ is the measurement angle between the illuminated and detected light paths, each assumed to populate a single direction in space to allow precise definition of q, $R_\theta$ is the Rayleigh ratio of the scattered light to the incident light at the measurement angle of θ=0, $M_w$ is the molecular weight, $A_2$, the $2^{nd}$ virial co-efficient and K and $P_\theta$ are defined using:

$$\frac{1}{P_\theta} = 1 + \frac{16\pi^2 n_o^2 R_G^2}{3\lambda_o^2}\sin^2\left(\frac{\theta}{2}\right) \qquad (3)$$

$$K = \frac{4\pi^2}{\lambda_o^4 N_A}\left(n_o\frac{d_n}{d_c}\right)^2, \qquad (4)$$

where $n_o$ is refractive index, $R_G$ is the radius of gyration, $\lambda_o$ is the laser wavelength, $N_A$ is Avogadro's number, and dn/dc is the differential refractive index increment. Scattering from large particles is anisotropic due to interference effects from wavelets scattering from different parts of the scattering centres. The scattering therefore becomes dependent on angle. However, if we could measure at θ=0 then $\sin^2(\theta/2)$ would be 0 and $1/P_\theta$ would be 1. The following advantages result:

From Eq. (3), at θ=0, $1/P_\theta=1$ and continuing to relate the scattering intensity to the $M_W$ as we do for smaller molecules, the size range for the measurement of molecular weight can be significantly increased.

b) By combining Equations (2) and (3) and measuring directly at zero angle, $1/M_w$ can be directly determined. This is a single measurement scheme for determining $M_w$, significantly reducing the $M_w$ measurement time compared to LALS or MALS. An improved $M_w$ accuracy also results as no fit to zero angle, e.g. from a Guinier plot, is required. Additionally, this means that molecular weight could more readily determined for multiple samples, loaded by an autosampler, or, for multiple concentrations by autotitration, for binding studies, for instance.

Combined zero angle and right angle light scattering detection is possible: right angle scattering can be used for very weakly scattering samples where very small fractions of large contaminants would dominate the signal for forward angle.

Adaptive light scattering schemes can be used to improve the zero-angle scattering signal to noise and mitigate the impact of contaminants.

Combining zero angle and higher angle measurements in a Guinier or a Zimm plot will allow the slope of the Rayleigh plot to be determined at the intercept, thereby allowing direct, batch, measurement of RG, the radius of Gyration, with high accuracy. For example, a combination of measurements of the scattering at zero angle and at a higher angle(s), e.g. scattering angles of 17° or 90° could be taken; or an additional detection measurement in the range 0°-17° could be taken. A traditional single-mode fibre or collimated detection path defined by a pin-hole could be used to detect the light, or an off-axis version of the zero angle optical arrangement described herein, where the shadow of the obscuration at the detector is large enough to accommodate off-axis measurements.

Depolarised Light Scattering

The aim of depolarised light scattering is to measure the translational and rotational components of colloidal motion using a polarised light. Typically a sample is excited with light of a known polarisation (e.g. vertically polarised). The components of the scattered light that are polarised parallel to the incoming light, and perpendicular to it, are detected.

The correlation functions $G_2$ of the scattered light for each detected polarisation state are given in equations (5) and (6) below. Here "V,H" indicates that the incoming light is vertically polarised, and the detected scatter is horizontally polarised. "V,V" indicates that the incoming light is vertically polarised, and the detected scatter is vertically polarised.[1]

$$G_{2,VH}(\tau) = (Ae^{-(\Gamma_{tr}+\Gamma_{rot})\tau})^2 + B \qquad (5)$$

$$G_{2,VV}(\tau) = (A_1 e^{-\Gamma_{tr}\tau} + A_2 e^{-(\Gamma_{tr}+\Gamma_{rot})\tau})^2 + B \qquad (6)$$

where $\Gamma_{Trans}$ and $\Gamma_{Rot}$ are the translational and rotational relaxation rates, respectively.

Noting that:

$$D_T = \Gamma_{Trans}/q^2 \text{ and} \quad (7)$$

$$\Theta = \Gamma_{Rot}/6 \quad (8)$$

where $\Theta$ and $D_T$ are the diffusion coefficients for rotational and translational motion, respectively, then we see from Eq. (8) that the rotational component is independent of the angle of detection. Further if $\theta=0$ in Eq. (1), i.e. zero-angle scattering, then we can measure $\Theta$ directly (with no need to subtract $D_T$), using the VH configuration, Eq. (5). $D_T$ is still required to reduce the relaxation data to a length and diameter, for instance, so we would still need to measure in both polarisation states, however the resulting rotational component would not depend on the uncertainty in $D_T$.

Figure 2:
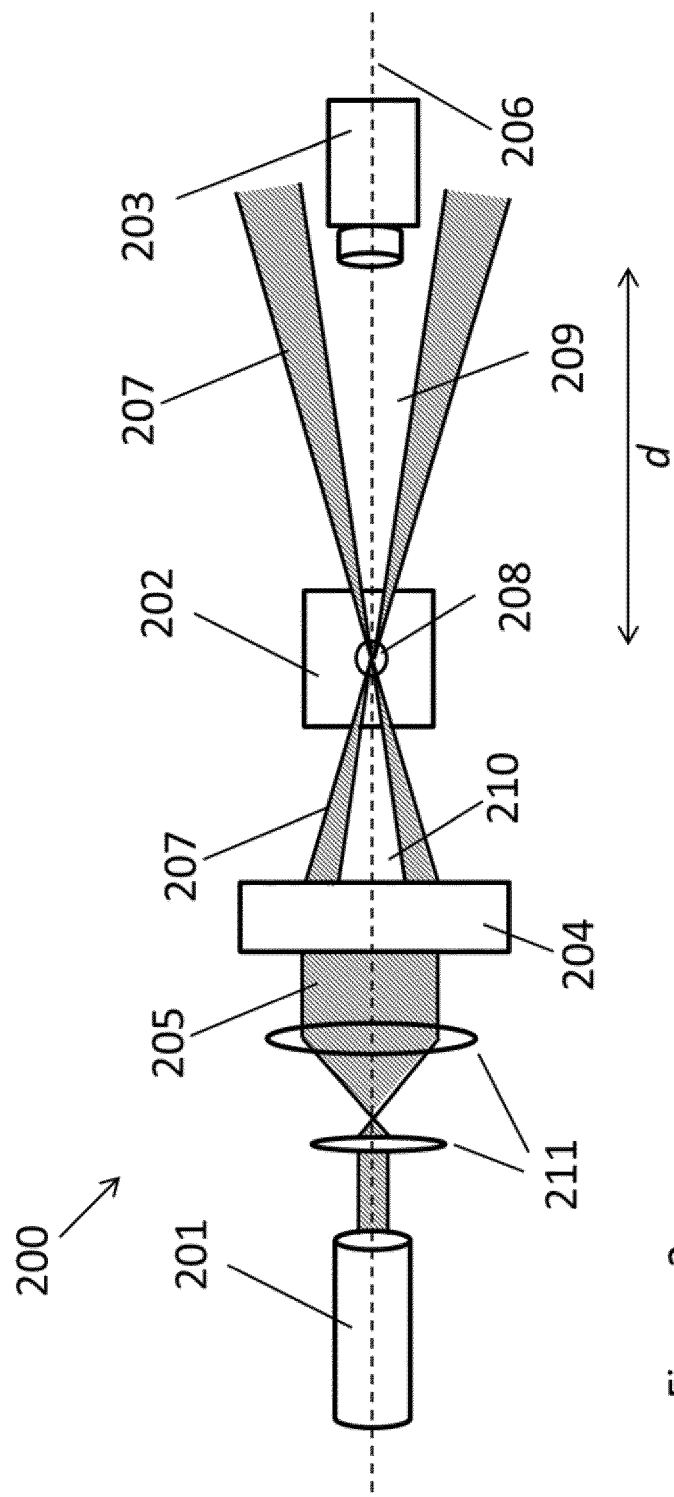
FIG. 2 is a schematic representation of a scattering instrument according to the present invention for measuring zero-angle scatter.

FIG. 2 shows an example of an instrument 200 according to the present invention. Instrument 200 can be used to measure zero-angle and low-angle scattered light, such as light scattered at an angle between 0 and 10° to the illumination axis. Instrument 201 comprises a light source, for example a laser, a sample cell 202, and a detector 203. The detector 203 is located at a distance d from the sample cell 202. A sample to be measured, for example a sample comprising a suspension of particles, can be placed in the sample cell 202.

Instrument 200 further comprises a light modifying optical element 204. Optical element 204 is positioned to receive light 205 emitted by the light source 201. Light 205 may for example be a collimated beam of light. Optical element 204 modifies light 205 to produce a modified beam 207. The modification may comprise, for example, refraction, diffraction, reflection, focusing, or obscuring the light, or some combination of these effects. In the illustrated example, light 205 is incident upon the optical element 204 along an illumination axis (or zero-axis) 206, from which the direction of light scattered by a sample in the sample cell can be defined.

The modified beam 207 is directed onto the sample cell 202 such that most of the intensity of the modified beam 207 converges in the sample cell 202 (e.g. the sample cell 202 is located at a particular distance along the illumination axis 206, and at least 90% of the intensity of the modified beam at that distance is located within the sample cell).

Within the sample cell 202 the modified beam 207 interferes with itself to produce an effective beam 208. The effective beam 208 has the properties of a beam of light travelling along the illumination axis 206. For example, the effective beam 208 may appear to be a plane wave, a wave with an Airy disc intensity pattern (as if the light had passed through a normal lens), or a Bessel beam. The effective beam 208 interacts with a sample in the sample cell 202, such that the sample "sees" the effective beam as a normal illumination beam, similar to the incident light 104 in conventional instrument 100. The sample may scatter light from the effective beam 208, just as it may scatter light from the illuminating light beam 104 in instrument 100. The scattered light can be detected with detector 203.

After passing through the sample cell 202, the modified beam 207 diverges, creating a dark region 209 which may be bounded by, or between bright parts of, the modified beam 207. The intensity of the modified beam 207 in the dark region 209 is substantially zero—for example sufficiently negligible for the detector 203 to not measure a significant signal from the modified beam 207. For example, at a particular distance d along the illumination axis 206 at which the detector 203 is located, the ratio of light intensity of the modified beam 207 in the dark region 209 to the light intensity in the brightest region of the modified beam 207 at the distance d may be less than 10-6.

Thus, substantially the only light in the dark region 209 is light that has been scattered from a sample in the sample cell 202. The detector 203 can be placed in the dark region 209, where it can receive the scattered light in (substantially) the absence of light from the modified beam 207. In the illustrated example, the detector is placed in the dark region 209 on the illumination axis 206. In particular, the detector may comprise an active detection area which is located in the dark region 209. In this position, the detector 203 can detect light scattered at zero-angle from the sample (i.e. light scattered along a scattering axis that is coincident with the illumination axis 206). The dark region 209 created by the modified beam 207 allows zero-angle scattered light to be detected without the complication of the much brighter illuminating light.

Instead of being positioned on the illumination axis (for instance with the centroid of the active detector area co-incident with the illumination axis), the detector 203 may be positioned to detect light scattered at low angles from the sample, for example at angles greater than 0°. The detector 203 may positioned to detect light scattered at any angle between 0° and 10°. Alternatively, the detector may be re-positionable to detect light at other angles, such as low angles, or any other angles. In some embodiments more than one detector may be used, for instance a detector positioned at 0° and a detector positioned at a non-zero angle (e.g. up to 10°) within the dark region 209.

Figure 3:
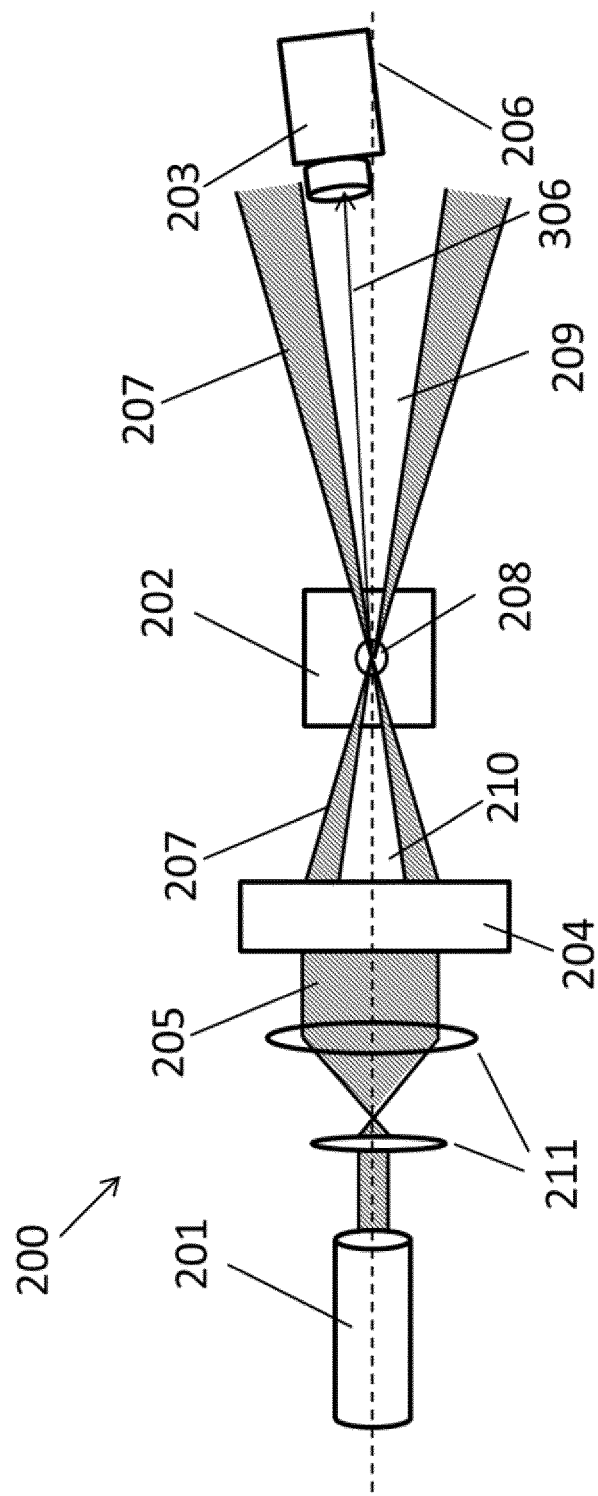
FIG. 3 shows an alternative arrangement of the instrument shown in FIG. 2.

FIG. 3 shows the detector 203 in a position to detect low angle scattered light. In this case, the detector 203 is placed to measure light scattered along a scattering axis 306 that is at an angle relative to the illumination axis 206. For example, the angle between the scattering axis 306 and the illumination axis 206 may be greater than 0° and/or less than 10°.

As well as creating a dark region 209 behind the sample cell 202, the modified beam 207 may also create a dark region 210 in front of the sample cell 202. Dark region 210 may be defined by the same criteria as described above for dark region 209.

Figure 4:
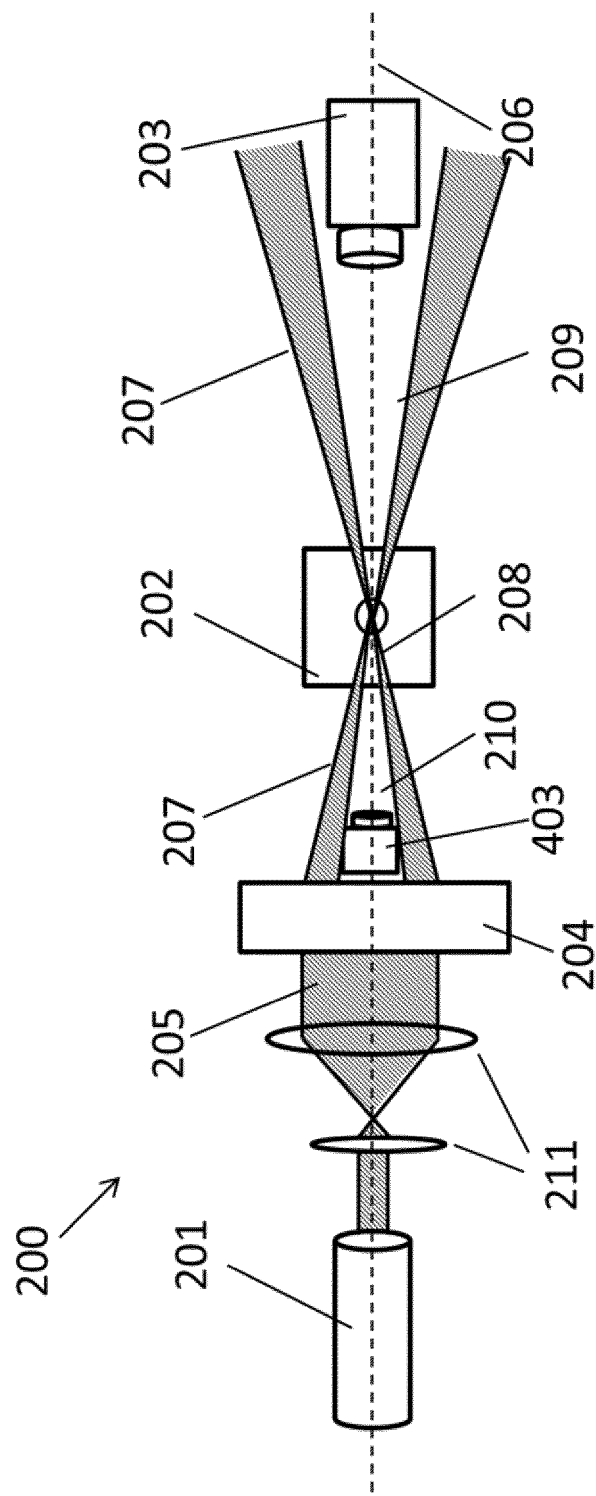
FIG. 4 shows a further alternative arrangement of the instrument shown in FIG. 2.

FIG. 4 shows a detector 403 in the dark region 210. The detector 403 may be the detector 203, re-positioned to a new location, or detector 403 may be an additional detector in the instrument 200. In the illustrated example, the detector 403 is placed along the illumination axis 206. In this position, the detector 403 can detect light that is back-scattered from a sample in the sample cell 202 at 180° to the forwards direction of the illumination axis 206 (i.e. π-scattered light). Detector 403 may also be able to detect, or be re-positionable to detect, light back-scattered along a scattering axis that is between 0 and 10° away from the illumination axis 206, similarly to detector 203.

In the instrument 200 illustrated in FIG. 2, the instrument further comprises a beam expander 211 between the light source 201 and optical element 204. The beam expander is an optional feature which may be used to increase the beam width of the light 205, for example so that light 205 fills the optical element 204. A beam expander 211 may particularly be used when light source 201 is a laser producing a narrow beam of collimated light 205. The beam expander may for example be a telescopic beam expander, comprising a pair of reflective or refractive optical elements.

In the above examples, the illumination axis 206 was described for convenience as the direction of light 205 incident upon the optical element 204. More particularly, the illumination axis is defined by the apparent direction the effective beam 208 travels in the sample cell 202—as this is the direction from which light is scattered by a sample. Generally, but not necessarily, this direction will be coincident with the direction of light 205 incident upon the optical element 204.

Figure 6B:
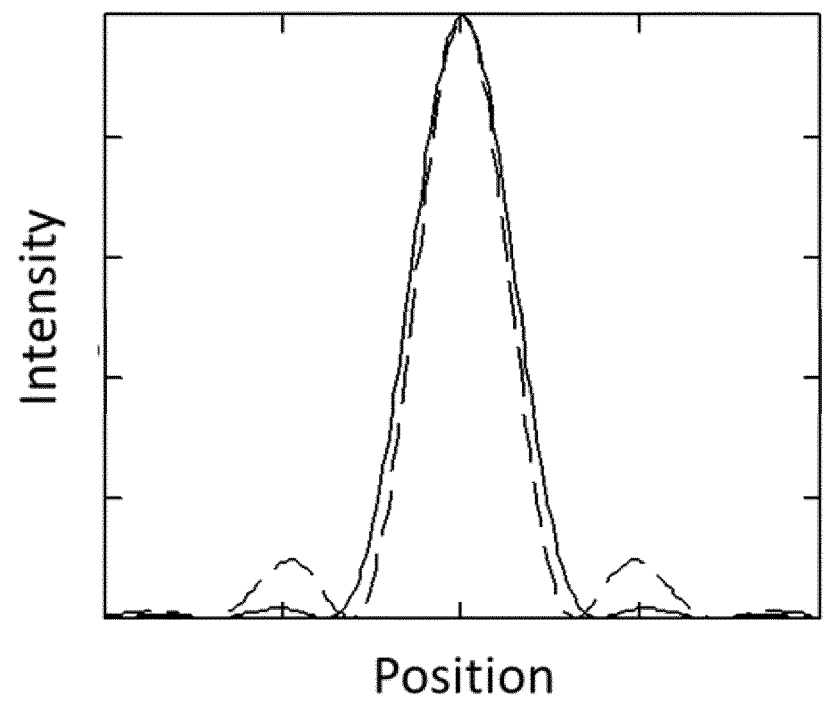
Figure 6A:
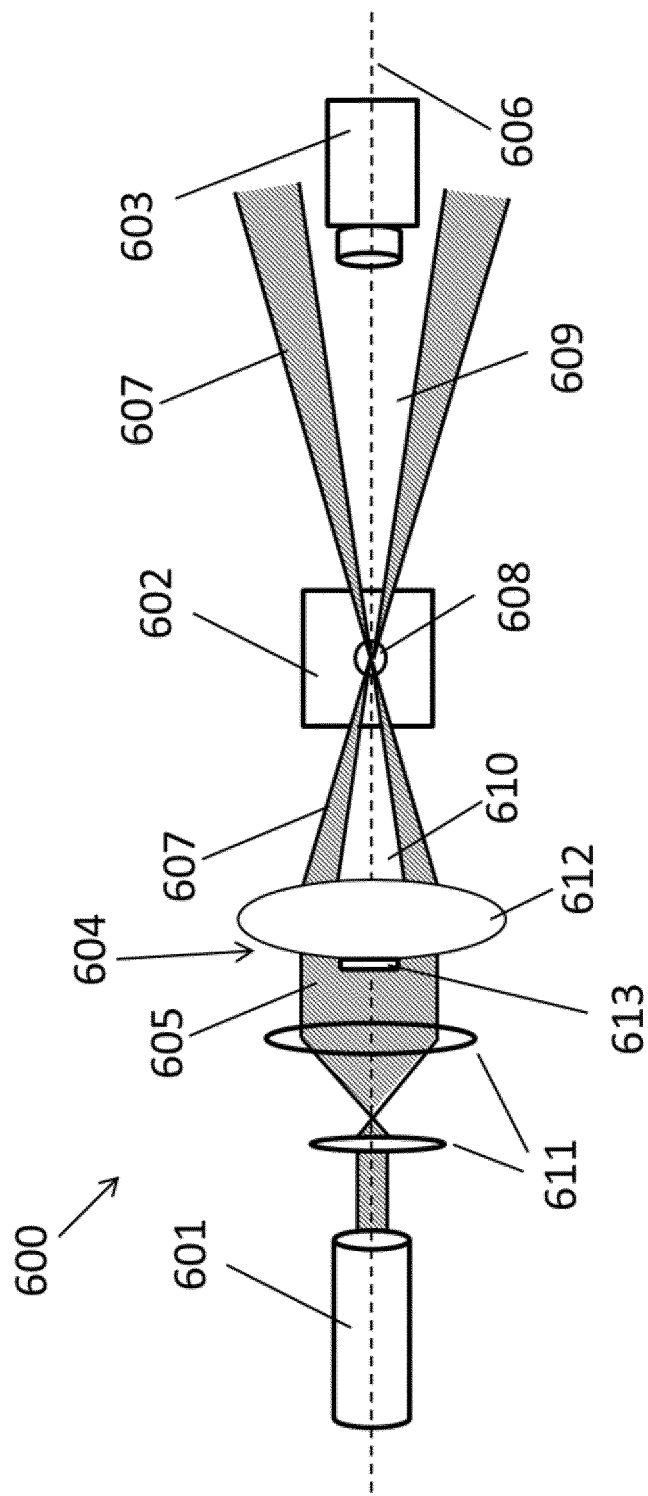
FIG. 6a is a schematic representation of an alternative exemplary optical element.
Figure 6C:
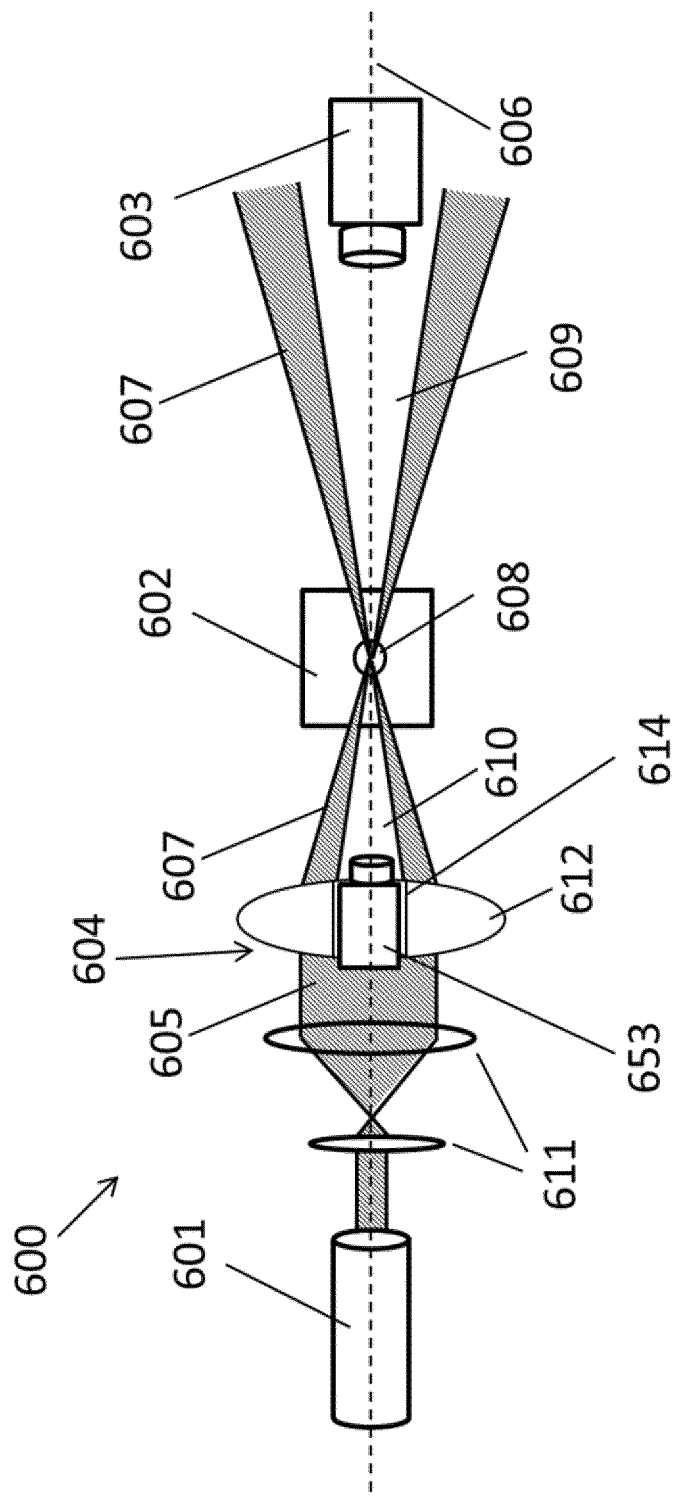
Figure 7:
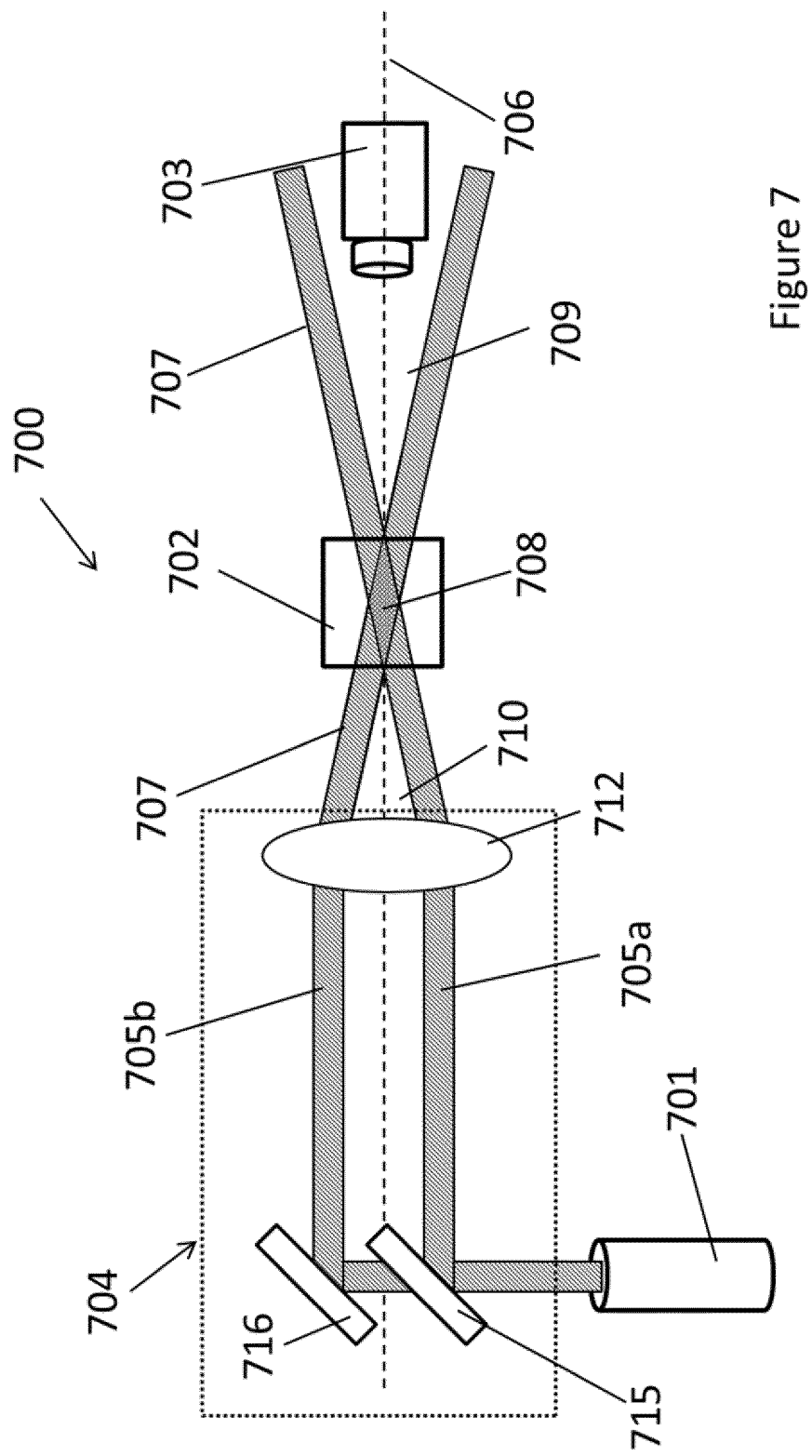
FIG. 7 is a schematic representation of an alternative exemplary optical element.

FIGS. 5 to 7 illustrate examples of optical elements that may be used as optical element 204 in instrument 200.

In one example, the optical element 204 may comprise an axicon lens. An axicon lens is a lens with at least one conical surface.

Figure 5A:
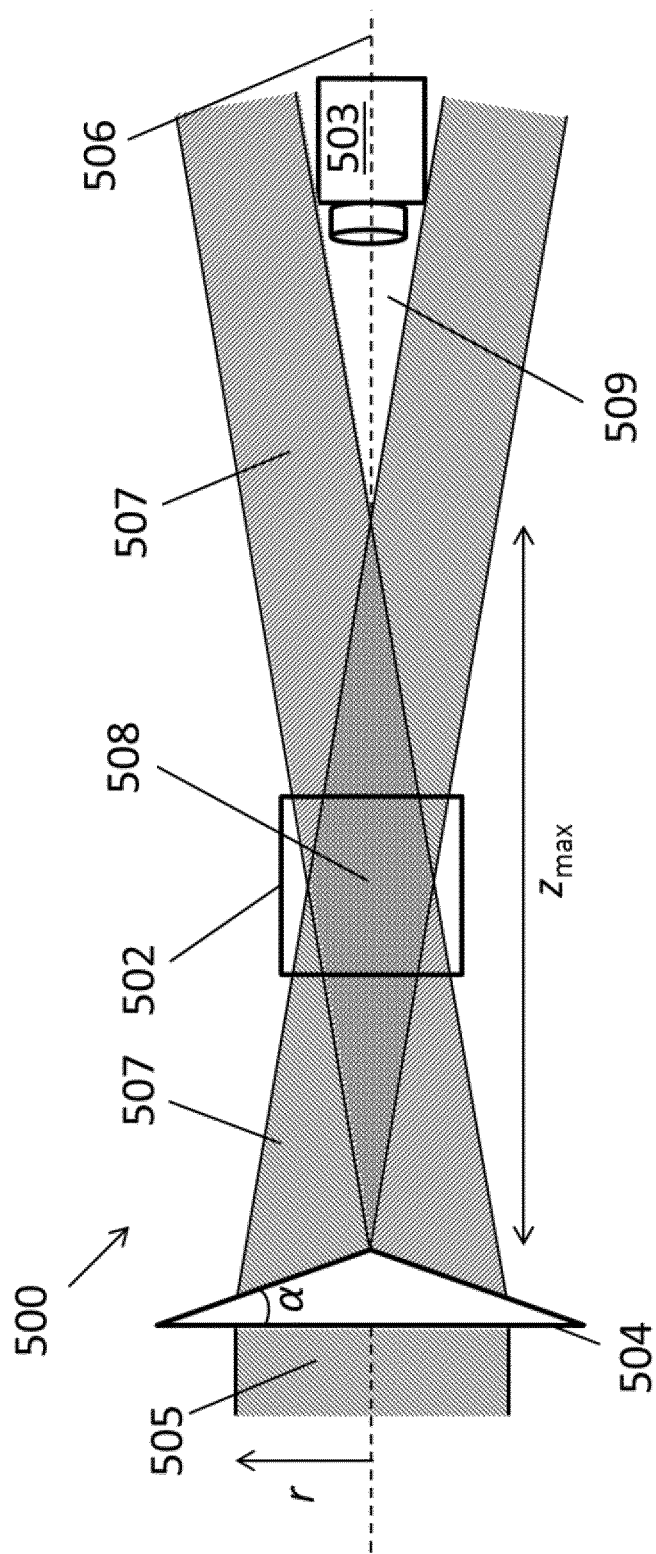
FIG. 5a is a schematic representation of an exemplary optical element.

FIG. 5a shows part of an instrument 500 with a plano-convex axicon lens 504 as the beam modifying optical element 204. Instrument 500 may be identical to instrument 200, but with the axicon 504 as the optical element 204.

The axicon 504 is illuminated with light 505 from the light source 201 (not shown in FIG. 5a). Light 505 may particularly be a plane wave or Gaussian beam travelling along the illumination axis 506. The axicon 504 modifies the light 505 to create a modified beam 507. The modified beam 507 first comes to a focus within the sample cell 502, and then diverges after the sample cell to form a ring, centred on the illumination axis, with a dark region 509 inside the ring.

Figure 5B:
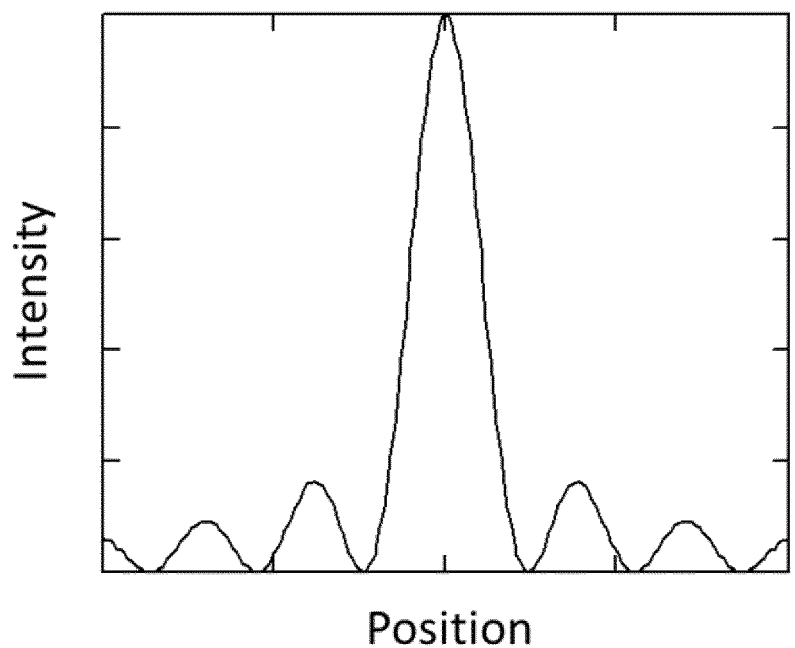

In the sample cell 502 the modified beam 507 interferes with itself to create an effective beam 508. The effective beam is an approximation to a Bessel beam, as shown by the representation of the spatial spread of intensity as a function of position across an exemplary line across the effective beam 508 is illustrated in FIG. 5b.

The effective beam 508 may exist, over a length of between 3 and 10 mm within the sample cell 502. The length of the effective beam may be determined by the beam width of the light 505 and/or the properties of the axicon 504, including, for example, the axicon angle of the axicon 504. For example, for an axicon angle ($\alpha$) of 0.5°, and a beam radius (r) of the incoming light 505 of 25 µm, the length ($z_{max}$) of the effective beam may be approximately 6 mm. The length ($z_{max}$) may be determined using the equation $z_{max}=r/\tan\theta$, where $\theta=\alpha(n-1)$, and where n is the refractive index of the axicon at the wavelength of the incident light 505. Preferably, the length along the illumination axis 506 of a sample within the sample cell 502 should be no greater than the length ($z_{max}$) of the effective beam 508.

Beyond the sample cell 502, the modified beam 507 diverges; forming the dark region 509 in which zero-angle and low-angle scattered light can be measured, as discussed above in relation to instrument 200. As can be seen in this figure, the modified beam 507 forms a ring of light around the illumination axis, with a dark region 509 enclosed by the ring of light.

In another example, the optical element 204 may be an obscured lens.

FIG. 6a shows an instrument 600 with an obscured lens 604 as the beam modifying optical element 204. Instrument 600 may be identical to instrument 200, but with the obscured lens 604 as the optical element 204.

The obscured lens 604 comprises a lens 612 and a light-blocking obscuration element 613. The lens 612 may be any type of converging lens or converging arrangement of optical components which focuses light onto the sample cell 602. Alternatively, reflective optics may be used, such as a curved mirror with an obscuration element 613 at its centre, the mirror configured to reflect and focus light onto the sample cell 602.

In the illustrated example, the obscuration element 613 is attached to the centre of the lens 612. The obscuration element 613 may for example be a mask, coating, or sticker placed on the lens. For example, a material may be coated onto the lens by adhering, spraying, plating, or vapour deposition. The obscuration may for example comprise a metal, such as copper.

The obscuration element 613 blocks the central portion of the light 605 incident upon the obscured lens 604, so that only a ring of light 605 passes through the lens 612. The lens 612 modifies this ring of light by focusing it, forming modified beam 607. The obscuration element 613 may be between 80% and 100% opaque to light at wavelengths emitted by the light source, and preferably between 95% and 100% opaque to light at such wavelengths.

Modified beam 607 comes to a focus in the sample cell 602, where it interferes with itself to form an effective beam 608. The effective beam 608 appears to be a wave travelling along the illumination axis 606, with an Airy disc intensity profile.

The modified beam 607 diverges after the sample cell 602, forming a ring of light with a dark region 609 inside the ring. A detector, such as detector 603, can be positioned in the dark region 609 to measure zero-angle and low-angle scattered light, as described above in relation to instrument 200. The modified beam 607 also forms a dark region 610 before the sample cell 602, enabling detection of $\pi$-angle, and close to $\pi$-angle scattered light, by a suitably placed detector, as described above in relation to instrument 200.

The intensity profile of an exemplary line across the effective beam 608 is shown in FIG. 6b. The intensity of the effective beam 608 is represented by the dotted line in FIG. 6b. The solid line represents the intensity profile a beam would have after passing through an un-obscured lens. Both profiles are Airy patterns, with a bright intensity maximum at the centre of the beam, and less bright maxima at periodically spaced positions away from the centre of the beam. Between the maxima there are points of minimum intensity. Compared to a beam passing through an unobscured lens, the non-central maxima of the effective beam are more intense, but are still much less intense than the central maximum. There are 2-phase discontinuities at each intensity minimum, but, as discussed in more detail below, the phase is otherwise planar at the focus and predominantly planar at small distances along the illumination axis from the focus. Furthermore, the 2-phase discontinuities are likely to arrive at the detector 603 at the local speed of light, which is much faster than can be detected by the detector 603, meaning that the phase discontinuities are unlikely to effect the detected signal.

In the far-field, beyond the sample cell 602, the intensity profile of the modified beam 607 resembles that of the modified beam 507 shown in FIG. 5c—i.e. a ring of light bounding a dark region 609.

In order for any light to pass through the obscured lens 604, the beamwidth of the incoming light 605 from light source 601 must be wider than the diameter of the obscuration 613. To achieve this, it may be necessary to expand the width of the light emitted by the light source 601. In the instrument 600 shown in FIG. 6a, the width of light 605 is expanded using beam expander 611. Beam expanded 611 may be the same as or similar to beam expander 211 described above.

In FIG. 6a, the obscuration element 613 comprises an object attached to or applied onto the lens 612. In alternative examples, the obscuration element 613 may comprise (instead of, or additionally to an object applied onto the lens 612), an object placed adjacent to the lens 612 such that it blocks a central portion of the light 605 from reaching the sample cell 602. Such an object may be placed before or after the lens 612.

In a particular example, a detector may act as the obscuration element. In particular, a detector positioned in dark region 610 to detect π-angle scattered light may be used as the obscuration element.

One example of an instrument 600 in which a detector 653 is used as the obscuration element is shown in FIG. 6c. In this example, lens 611 comprises an aperture 614 through its centre. The detector 653 is at least partially located within the aperture 614. An active detector area of the detector 653 faces the sample cell 602, so that π-angle or close to π-angle back-scattered light can be detected. The active detector area faces away from the incident light 605, so does not detect a significant signal from the light 605. The detector 653 forms a physical block, preventing a central portion of the incident light 605 from passing, thus acting as the obscuration element. Such an arrangement may provide a particularly compact system for measuring π-angle scatter. The instrument 600 may also comprise a detector 603 positioned to detect zero-angle and low-angle scattered light.

In another example, the optical element 204 may comprise two coherent light sources and one or more lenses or other optics configured to direct the light onto the sample cell.

The two coherent light sources may comprise two different light sources, for example two coherently related lasers. Alternatively, the two coherent light sources may comprise a single light source and a beam splitter positioned to split the beam into a first portion and a second portion—the first and second portions acting as the two coherent light sources.

FIG. 7 shows an instrument 700 with a light modifying optical element 704 that comprises a beam splitter 715 and a lens 712. Instrument 700 may be identical to instrument 200, but with the optical element 704 as the optical element 204.

The beam splitter 715 splits light from the light source 701 into two portions: first portion 705a; and second portion 705b. In the illustrated example, the beam splitter reflects the first portion 705a and transmits the second portion 705b. Beam splitter 715 may in particular reflect 50% (or between 49% and 51%) of the light incident upon it to form the first portion 705a, but may alternatively reflect any other percentage of the incident light from light source 701.

In the illustrated example, the reflected first portion 705a is directed onto the lens 712. A mirror 716 is used to direct the second portion 705b onto the lens 712. The mirror 716 is arranged to reflect the second portion 705b such that the first portion 705a and second portion 705b are travelling along parallel directions when they are incident upon the lens 712. In alternative examples, additional or alternative reflective or refractive optics may be used to direct the two portions of light 705a, 705b onto the lens 712.

The lens 712 deflects the first portion 715a in a first direction towards the sample cell 702. The lens 712 deflects the second portion 715b in a second direction towards the sample cell 702. The two deflected portions form the modified beam 707. The first direction is opposite to the second direction. In a preferred example, this is achieved by positioning the lens 712 such that the first portion 715a and second portion 715b are incident on the lens 712 at opposing positions relative to an optical axis (or centre) of the lens 712. The lens 712 may be symmetric about its optical axis.

The modified beam 707, comprising the defected first and second portions 705a, 705b, converges at the sample cell 702. The two portions interfere with each other in the sample cell 702 to produce an effective beam 708. The effective beam 708 appears to be a forward (i.e. along the illumination axis 706) traveling plane wave, with secondary intensity fringes located away from the illumination axis 706 in a direction orthogonal to the illumination axis 706. The secondary fringes may for example be used to illuminate small samples, such as samples in a capillary cell separate to the illustrated sample cell 702, by placing the small sample in the path of one of the secondary fringes.

Away from the sample cell 702 in both directions along the illumination axis, the modified beam diverges, creating dark regions 709 and 710 between the diverged beam portions, respectively after and before the sample cell 702. A detector placed in the dark region 709, 710 can detect zero- or low-angle scatter, and a detector placed in the dark region 710 can detect π-angle or close to π-angle scattered light, as described above in relation to instrument 200.

Although in the illustrated example of instrument 700 a single lens 712 was used to defect the portions of light 705a, 705b, in other examples two or more lenses could be used. In some examples, each of the portions 705a, 705b may be incident on a separate lens. The lenses should be positioned to deflect the portions onto a common point at the sample cell 702 to create the effective beam 708. Further, additional sources of light coherent with the first and second portions 705a, 705b may also be deflected onto the sample cell 702. For example, additional beam splitters may be used to split light from the light source 701 into additional portions.

In some examples of an instrument 700, it may be possible to block one of the portions of light 705a, 705b, for example with a beam dump. The unblocked portion may then be used to illuminate a sample in a conventional way, without forming a modified beam. Light scattered from this conventional illumination may be detected with the detector 703 or an additional detector. In this way the instrument 700 can be easily modified to take a conventional high-angle scattering measurement.

In some circumstances, it may be desirable to upgrade an existing scattering measurement instrument to enable zero-angle or low-angle scatter; or π-angle or close to π-angle scatter. For example, it may be desirable to re-use an existing detector.

Figure 8:
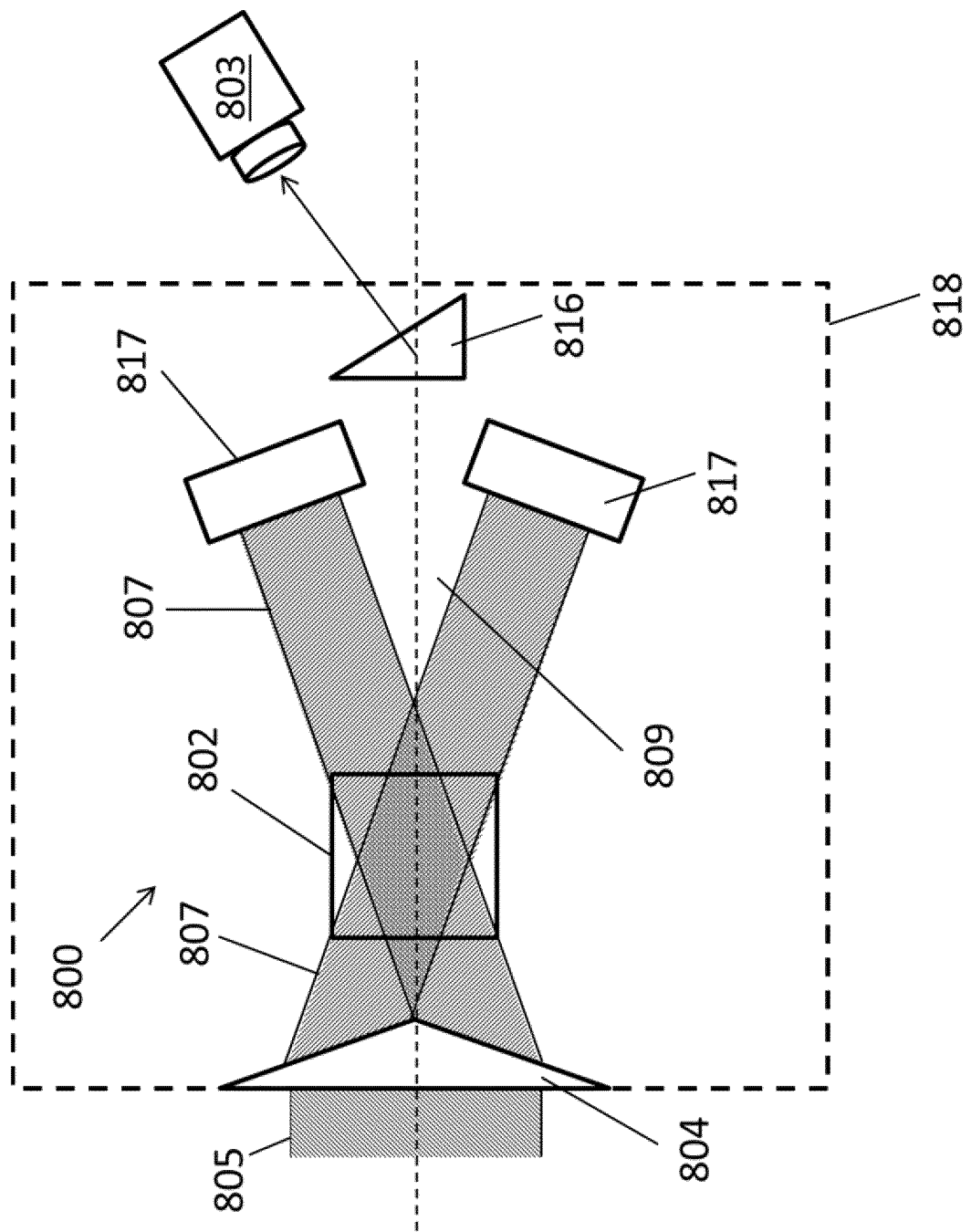
FIG. 8 is a schematic representation of an alternative instrument.

FIG. 8 shows an example of part of an instrument 800. Instrument 800 is substantially similar to instrument 500, but instead of placing the detector inside the dark region 809, the detector is placed at a different position, in this example at 17° from the illumination axis 806. This may be the position of the detector in an existing instrument, for example.

Instrument 800 comprises a prism 816 placed in the dark region 809, and on the illumination axis 806. The prism is configured to deflect zero-angle and low-angle scatter to a different angle relative to the illumination axis 806—in this case the scattered light is deflected to an angle of 17° relative to the illumination axis 806, so that the zero angle scattered light can be detected by a detector positioned along a scattering axis of 17° from the scattering angle. The prism may be configured to deflect the scattered light to any other angle so that it can be detected by a detector.

To ensure that none, or only a negligible amount, of the modified beam 807 reaches the detector, an optional beam dump or beam dumps 817 may be used, as shown in FIG. 8 (which trap the light to prevent optical noise).

Although FIG. 8 shows the instrument 800 using an axicon as the optical element 804, the deflecting prism 816 and/or beam dump/s 817 may be used in instruments comprising any other optical element, particularly in instruments

200, 500, 600, 700. In place of the prism 816, any other light deflecting element may be used to defect scattered light to a detector, for example an appropriately positioned mirror.

To further enable retrofitting of an existing instrument, the optical element (e.g. axicon) 804, sample cell 802, prism 816 and, optionally, beam dumps 817 may be supported on a body 818, the body 818 configured to be placed into a sample holder of an existing instrument. The body may 818, for example, be compatible with a cuvette holder and may be transparent (e.g. glass). This may enable an existing instrument to be easily retrofitted without requiring significant modification, and the new components may easily be removed. For example, the larger sample holder of the existing instrument may be a 12 mm×12 mm cuvette holder. The optical element 804, sample cell 802 (e.g. a capillary cell), prism 816 and optionally beam dumps 817 may for example be attached to a substrate or holder than can be removably placed into the cuvette holder to retrofit the existing instrument.

Software for controlling an instrument may be configured to recognise when the body 818 (or the optical assembly comprising the body and the optical element) has been placed into the instrument, for example based on a user input indicating that the accessory is present. When the body is used, the software may operate in a zero-angle mode, operating the instrument to perform a zero-angle scattering measurement rather than a conventional, large-angle scattering measurement. The body or optical assembly may be automatically detected by the software and instrument when placed in the instrument, for example by detecting a bar code on the body. Alternatively a user of the software may select a zero-angle option on the software.

In some examples, such as in the instruments described above, the sample cell may be a well in a well-plate or auto-sampler tray.

In conventional instruments, it can be difficult to measure back-scattered light scattered from a sample in a sample well, particularly if the sample well has a small volume. Even at small angles away from π-angle, the scattered light and/or the illuminating light is liable to be blocked by the walls of the well.

This difficulty can be resolved using the optical elements of the present invention. Illuminating light can be incident directly on the sample well, along an optical axis that is parallel to the walls of the well, preventing the illuminating light from being blocked by the walls. The path of light scattered at π-angle, or very close to π-angle will then also be free of interception with the walls. This back-scattered light can be detected with a detector in the dark region, as described above.

Figure 9:
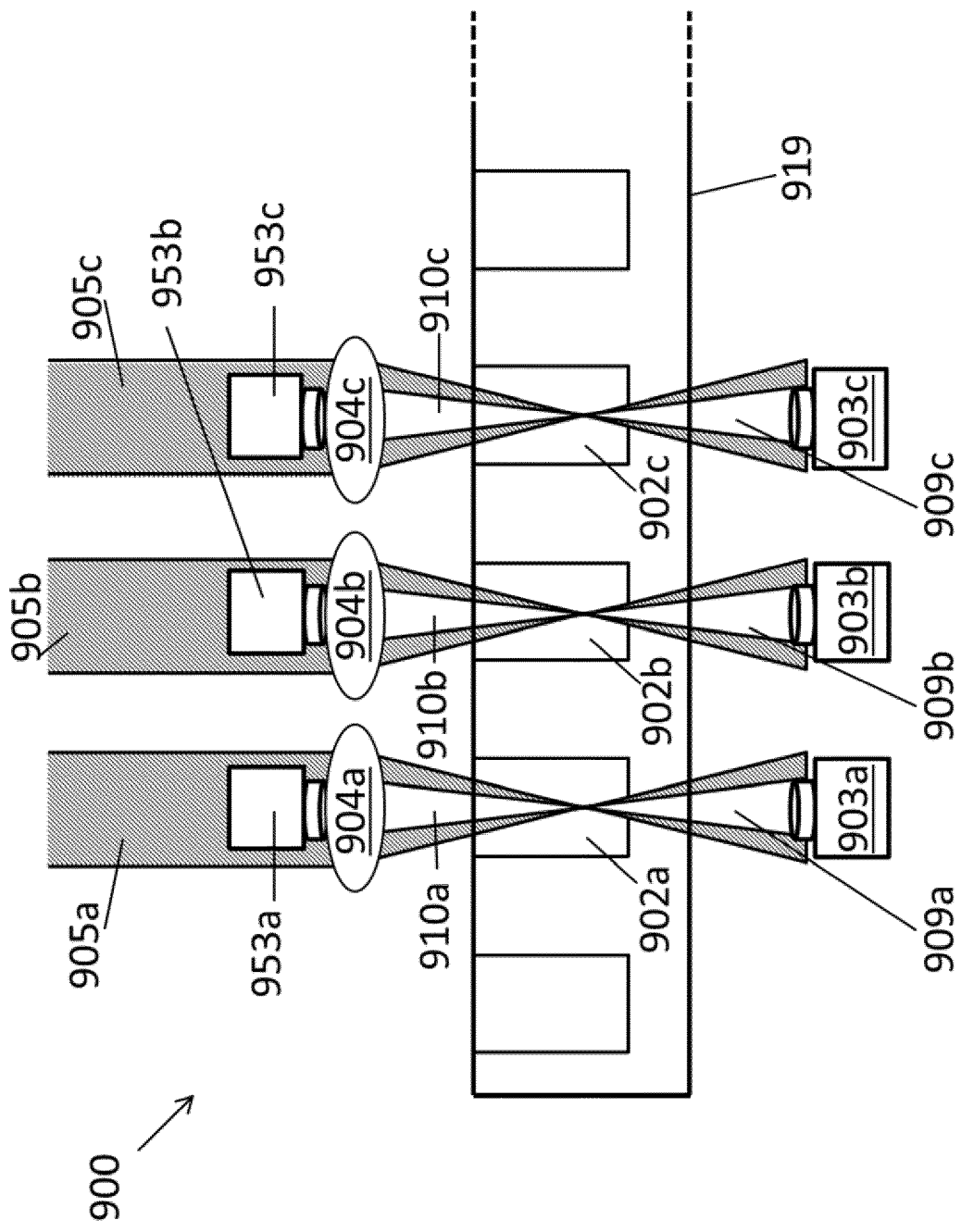
FIG. 9 is a schematic representation of an instrument for detecting scatter from scatter in sample wells.

An example of an instrument 900 for use with a well-plate is shown in FIG. 9.

Instrument 900 comprises multiple light sources (not shown in FIG. 9) producing light beams 905a, 905b, and 905c (other numbers of lights sources are possible). The light sources may be multiple lasers, or may be beam splitters which divide a single beam of light into multiple beams 905a, 905b, 905c. Each beam of light 905a, 905b, 905c illuminates a separate well 902a-c of a well plate 919, and is modified by a separate optical element 904a-c. The optical elements 904a-c may comprise any of the optical elements described above. The use of multiple illumination beams and corresponding multiple detection arrangements facilitates parallel analysis of multiple well plates.

Light that is scattered from samples in the sample wells 902a-c along the illumination axes (i.e. zero-angle scatter), or light that is scattered at angles close to zero, may be detected by detectors 903a-c placed in dark regions 909a-c respectively. Light that is back-scattered from samples in the sample wells 902a-c along the illumination axes 906a-c (i.e. π-angle scatter), or light that is scattered at angles close to π-angle, may be detected by detectors 953a-c placed in dark regions 910a-c respectively.

In some examples, one or more of the optical elements 904a-c may comprise an obscured lens similar to obscured lens 604. The obscuration element in this case may be the respective back-scatter detector 953a-c, similarly to the instrument shown in FIG. 6b. The detector 953a-c may for example comprise a GRIN (gradient index) lens optically coupled to an optical fibre. The detector 953a-c may be placed behind the lens, or through an aperture in the lens (not shown in FIG. 9).

In any of the above examples of instruments, an additional detector may be used to detect light scattered at additional angles. In particular, an additional detector may be positioned to detect light scattered at an angle of 90° to the illumination axis. Simultaneous measurement of light scattered along at zero-angle and at 90° to the illumination axis may be particularly useful for extracting properties of the particles in a sample. Any of the detectors described above may be moveable to detect light scattered at additional angles. For example, light scattered at zero-angle and light scattered at one or more non-zero angles may be measured into order to estimate the rate of change of the scattering intensity with respect to scattering angle at zero-angle. Such measurements may be used, for example, to measure the radius of gyration of particles in a sample.

In any of the above examples of instruments, the instrument may further comprise one or more independent concentration detectors, such as a UV detector or refractive index detector.

The data collected by the detector in any of the instruments described above may have to be corrected to account for differences between the effective beam and the light from the light source. For example, apparent propagation vector of the effective beam (given by the sum of the propagation vectors in the modified beam) will be shorter than the propagation vector of the light from the light source, due to the angle of the propagation vectors of the modified beam. Without correction of the measured data, this shortening may be falsely interpreted as a change in refractive index.

In some examples, the scattered light may be coupled into a single-mode fibre as part of a detector system. For example a GRIN lens may be used to couple the scattered light into an optical fibre, as described above.

Where the instrument comprises an imaging system, i.e. where an image for example of the light source is formed in the sample cell, it may be difficult to couple off-axis scattered light into a fibre. It is possible to couple such light, but the coupling efficiency may be reduced compared to on-axis light. Additionally, improved rejection of light scattered from the defocussed image is desirable at this manifests itself in the measurement as an additional range of illumination angles.

Figure 10A:
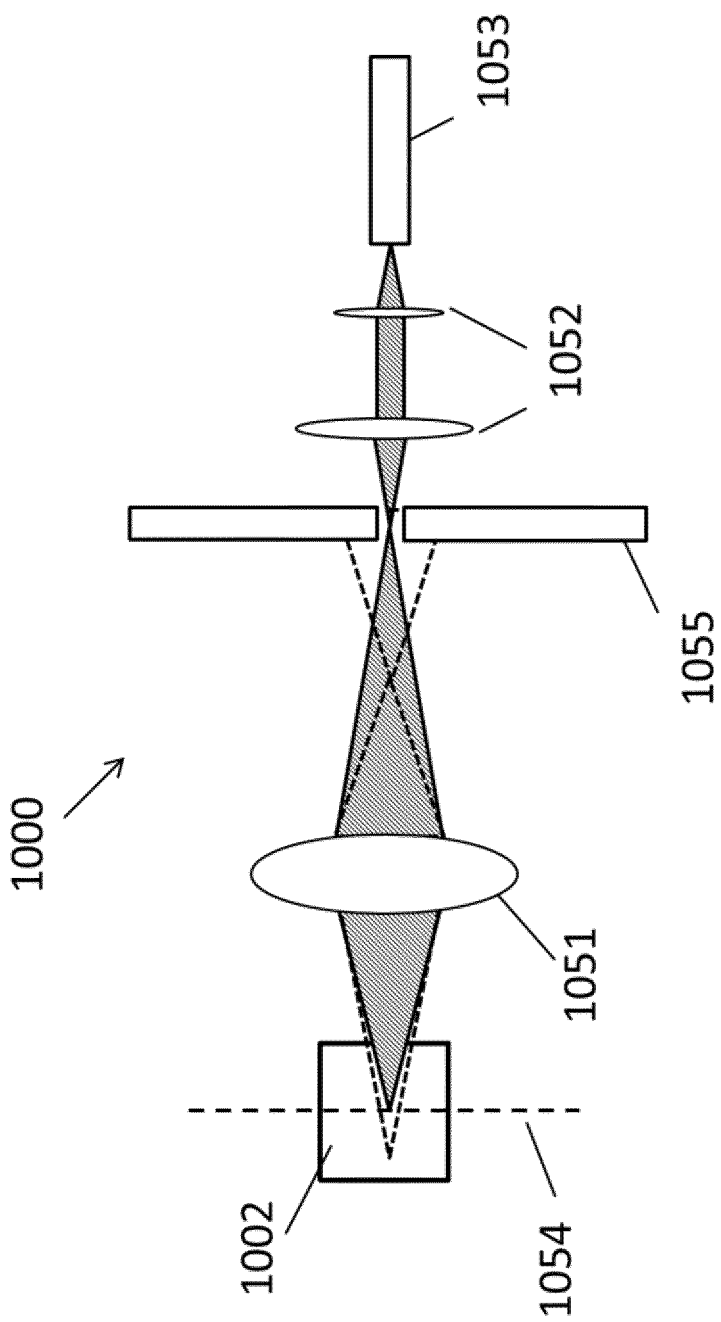
FIGS. 10a and 10b show alternatives of an optical filtering system.
Figure 10B:
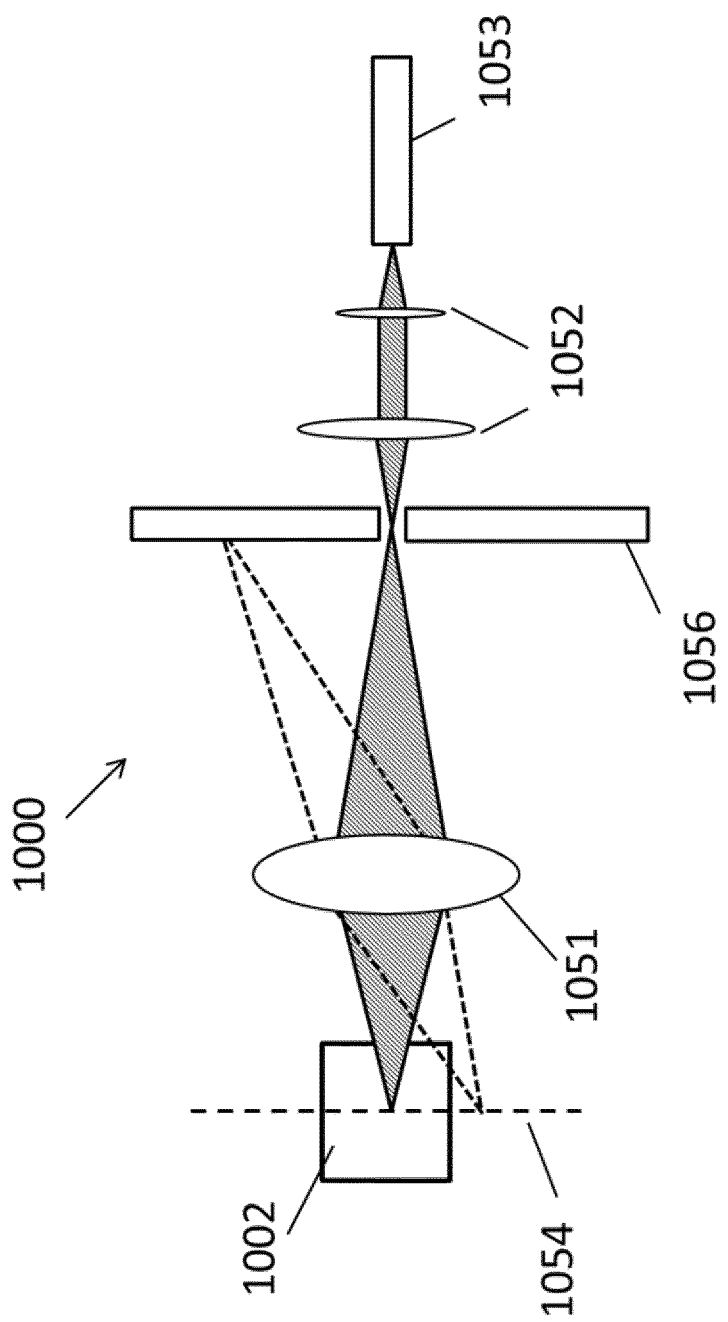

To mitigate these effects, an optical filtering arrangement may be used to filter scatter from the non-focused image. FIGS. 10a and 10b show two such optical filtering arrangements. In both alternatives, the optical filtering system comprises a collecting lens 1051 for collecting and focusing light scattered at zero- and low-angles from the sample cell 1002. Both alternatives further comprise a pair 1052 of coupling lenses configured to couple light into an optical fibre 1053, but other arrangements are envisaged. At least one of the lenses may be a GRIN lens. In both cases light from a light source forms an image in the sample cell 1002 at the image plane 1054. Light from the image is scattered by a sample in the sample cell 1002.

In FIG. 10a, the optical filtering arrangement comprises a confocal stop 1055—i.e. an aperture positioned at the focal point of light scattered from the image in the image plane 1054. Light scattered from the image is collected and focused by the lens 1051. The confocal stop 1055 is placed at the focus of this image plane-scattered light. Light that was not scattered from the image plane 1054 that is collected by lens 1051 will be focused at a different position. Thus at the confocal stop 1055, substantially only light from the image plane 1054 will be focused and able to pass through the aperture.

In FIG. 10a, the hashed light beam shown with solid lines represents light scattered from the image in the image plane 1054, whereas the light beam shown with broken lines represents light scattered from a non-focused image.

In FIG. 10b, a field stop 1056 is used in place of confocal stop 1055. Field stop 1056 comprises an aperture placed at the focal point of light scattered from the image in the image plane 1054 along a particular axis, for example the optical axis. Any light scattered along different axes will come to a focus away from the aperture, and so will not pass through the aperture.

In FIG. 10b, the shaded light beam shown with solid lines represents light scattered from the image in the image plane 1054 along the optical axis, whereas the light beam shown with broken lines represents light scattered off-axis.

Figure 11:
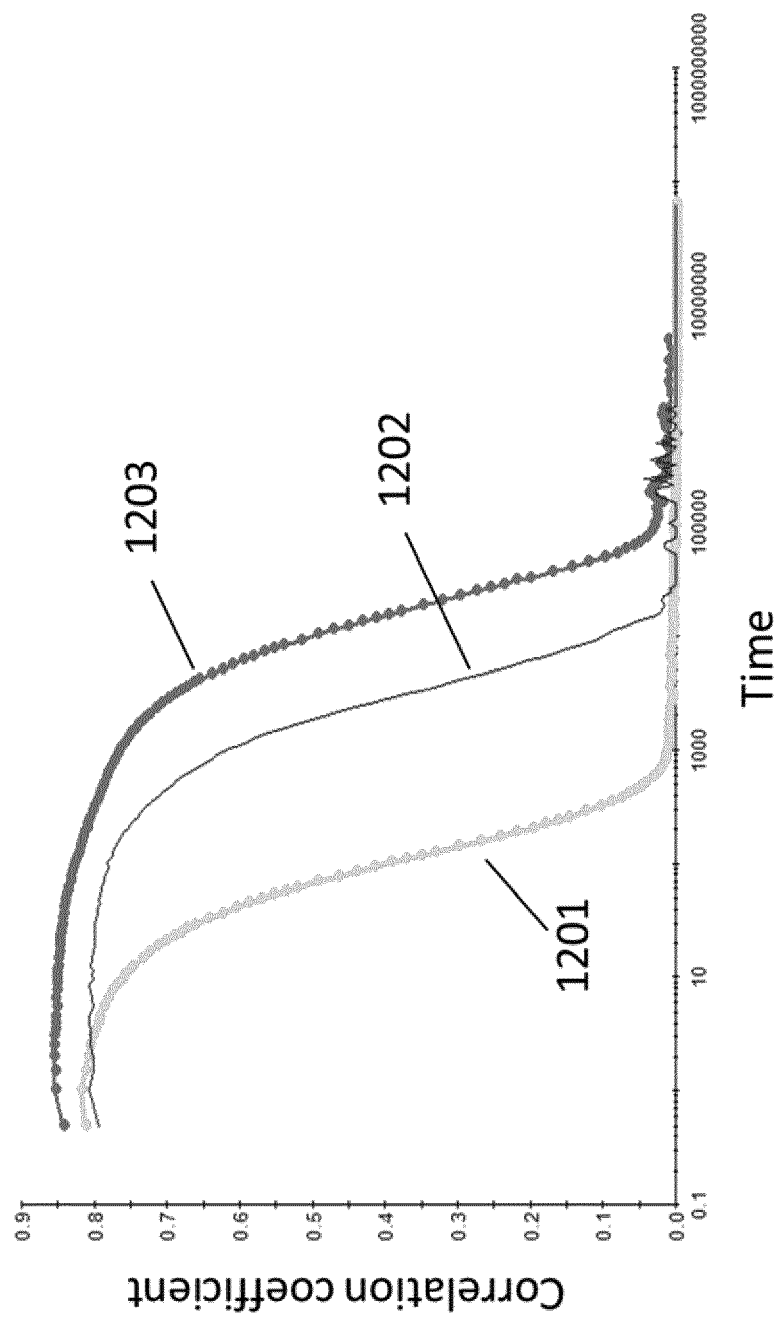
FIGS. 11 and 12 show experimental results of low-angle scattering measurements.
Figure 12:
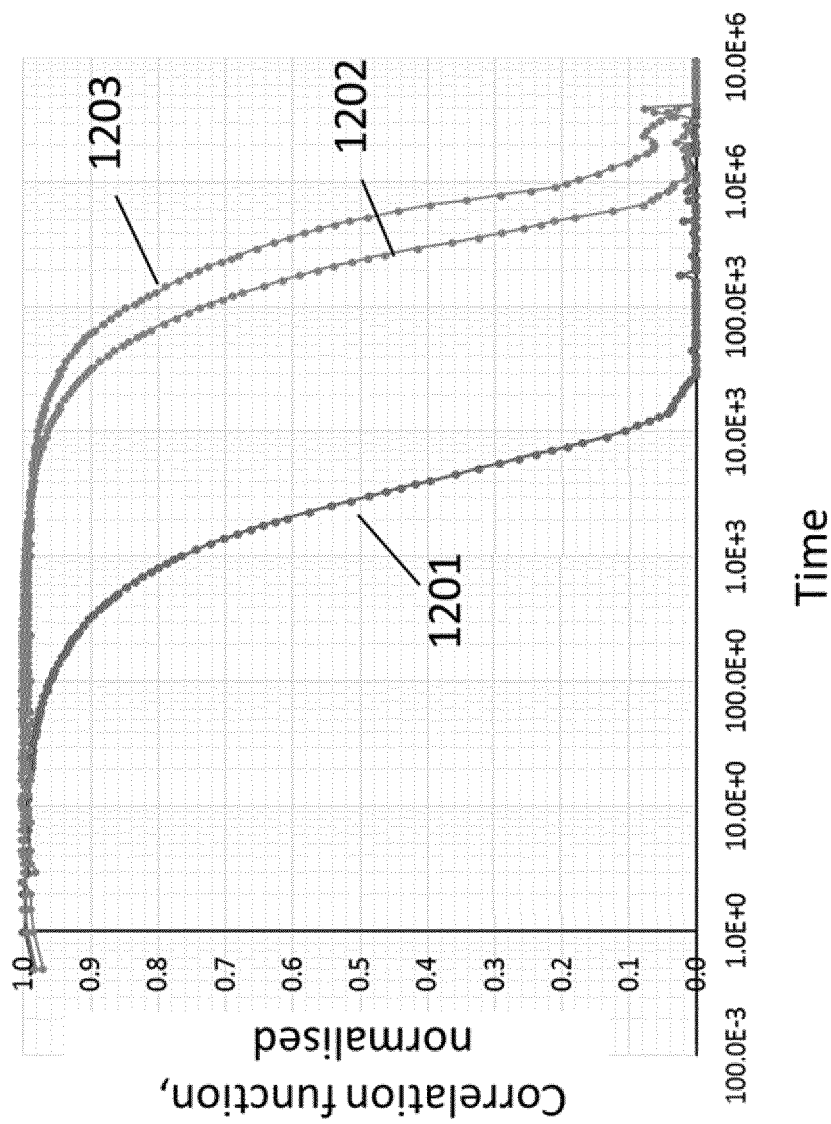

Example experimental results from an instrument using an early prototype obscured lens as the optical element are shown in FIGS. 11 and 12.

Light scattered from a dispersion of 60 nm latex at angles of 173° (backscatter—non-imaged detection), 17° (forward scatter, non-imaged detection) and nominally zero-angle (imaging optics) was detected. FIG. 11 shows the correlation coefficient for each of these detection angles (line 1201—173°; line 1202—17°; line 1203—zero-angle) as a function of delay time.

Further data for scattering of 60 nm latex is shown in FIG. 12. This figure shows the correlation function as a function of delay time for scattering angles of 12.8° (line 1301), 3.8° (line 1302), and zero-angle (line 1303).

In both FIG. 11 and FIG. 12, the prototype zero angle scattering detection has a longer correlation time than the conventional low angle detector approach (of 17° and 3.8° respectively). The exponential form of the correlogram for zero angle detection indicates a single detection angle. This demonstrates that the detected part of the illuminated portion of the sample does indeed form an image with a predominantly planar phase distribution, which is then sampled by the single-mode fibre detection path.

In the above examples, measurements of bulk liquid samples were described. However, instruments according to the present invention may be used to investigate any form of sample, including solid samples, for example held in a sample mount of the instrument, and droplets of liquid sample. For example, the sample cell may comprise a droplet surface or wicking surface for holding a droplet of sample to be investigated. Such an instrument is shown in FIG. 13.

Figure 13:
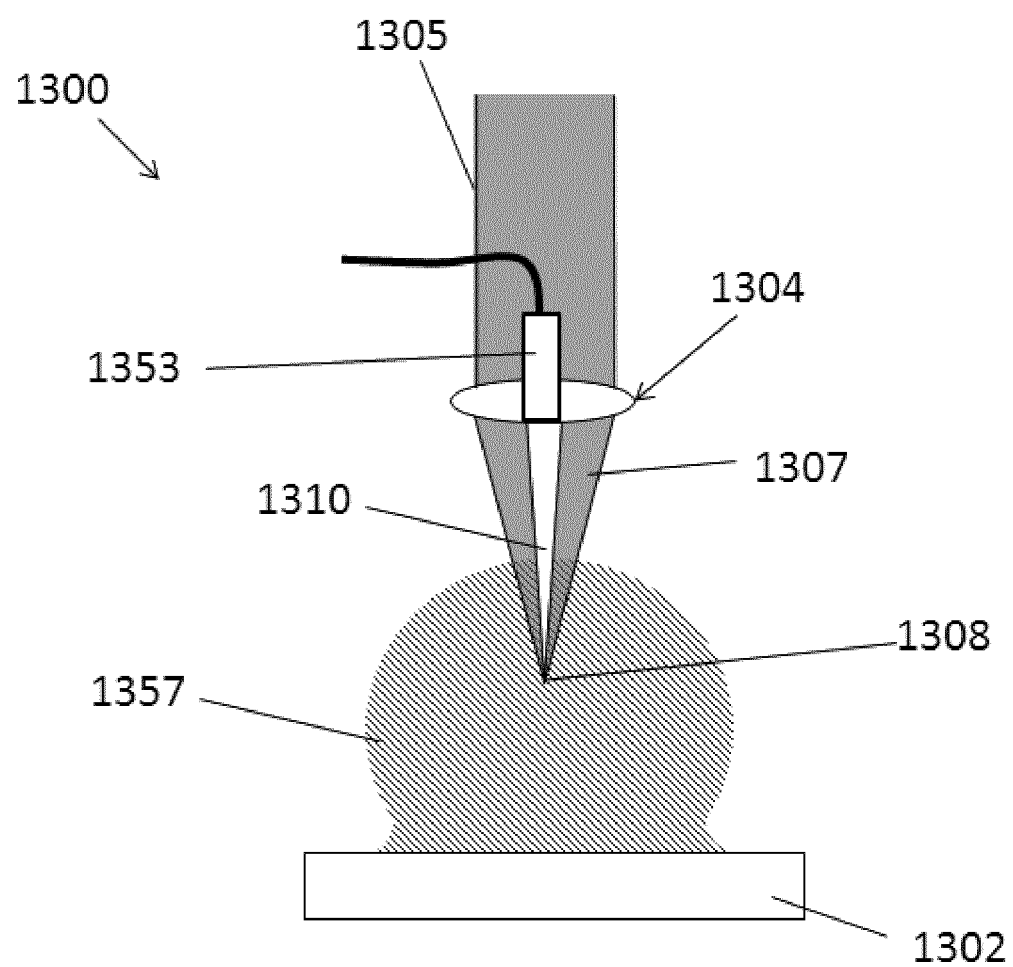
FIG. 13 shows part of an instrument in which a light beam is modified by optical element to produce a modified beam that is directed towards a droplet of sample held on droplet surface of a sample cell.

FIG. 13 shows part of an instrument 1300, in which a light beam 1305 is modified by optical element 1304 to produce a modified beam 1307 that is directed towards a droplet of sample 1357 held on droplet surface 1302 of a sample cell. The modified beam 1307 interferes with itself to produce an effective beam 1308 within the droplet 1357. The modified beam 1307 forms a dark region 1310. Back scattered light is detected with detector 1353. The optical element 1304 may be any optical element described above. The instrument 1300 may alternatively or additionally detect forward scattered light that passes through the droplet surface 1302, similarly to the examples of described above.

In the illustrated example, the modified beam illuminates only a small section of the droplet. The instrument detects back-scattered light from that same small section of the droplet, thereby avoiding beam steering by the surface geometry and desensitizing the measurement to the refractive index of the sample.

An example of a sample cell comprising a droplet surface is described in the applicant's co-pending application EP2404154, which is incorporated herein by reference.

Figure 14A:
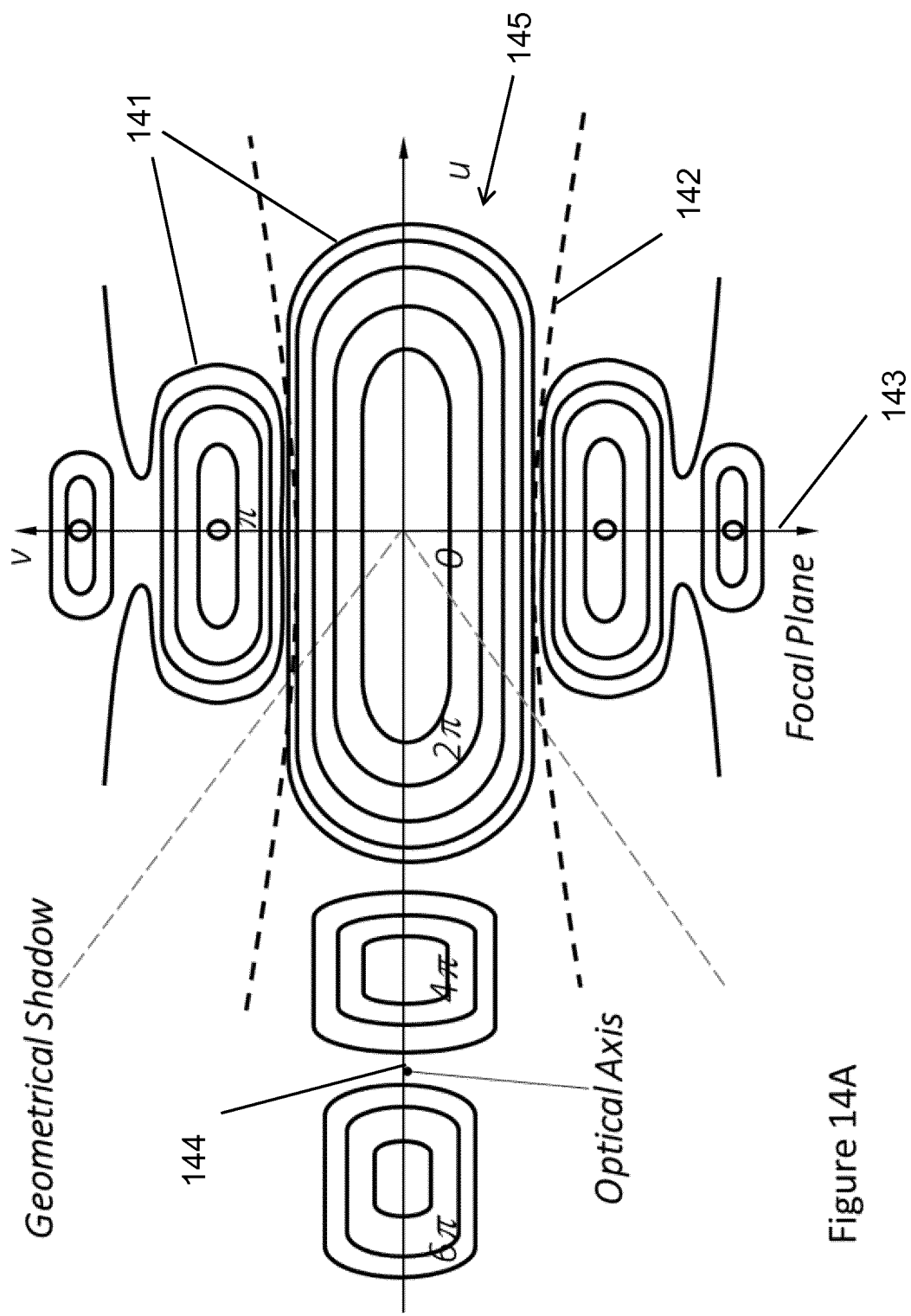
FIG. 14A is a schematic representation of an instrument used for measuring droplets of samples.
Figure 14B:
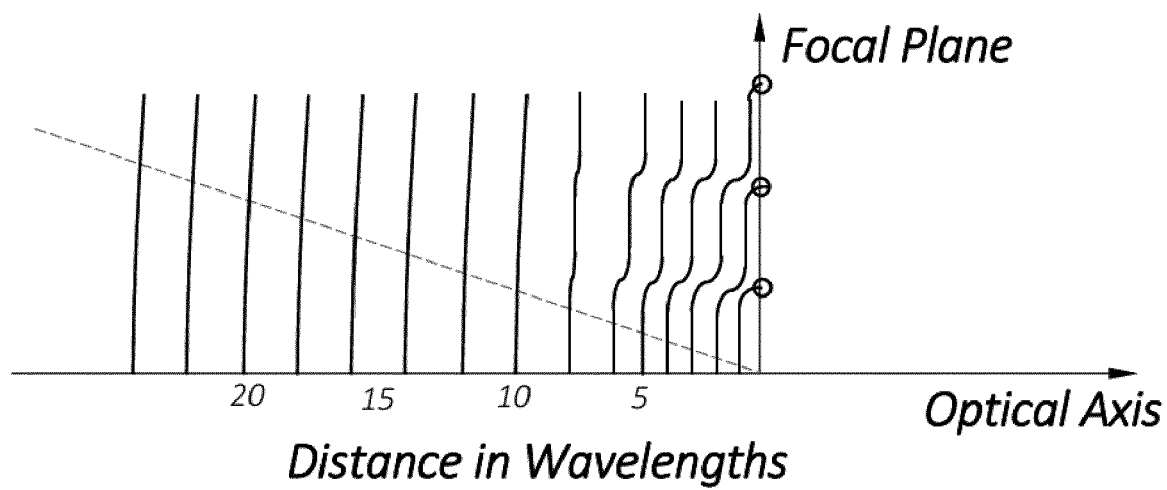
FIG. 14B illustrates how the effective beam generated by the optical element approximates a plane wave at the sample position.

FIGS. 14A and 14B illustrate how the effective beam generated by the optical element, for example optical element 204, approximates a plane wave at the sample position. FIG. 14A shows the intensity profile of an effective beam in the sample cell, as generated by an obscured lens, such as obscured lens 604, illuminated by a plane wave having a single wavelength. The figure shows the isophotes 141 of intensity in the region of the focal plane 143 of the obscured lens. In common with the intensity profile shown in FIG. 6B, FIG. 14 shows a maximal peak or central lobe 145 centred on the optical axis u, 144, and smaller maxima offset from the optical axis in the focal plane v. FIG. 14B illustrates the phase variation near the focal plane, showing lines of constant phase plotted on a graph in which the y-axis is transverse distance from the optical axis, and the x-axis is longitudinal distance from the focal plane.

As can be seen in these figures, beyond ~5 wavelengths (i.e. the wavelength of the illuminating light) from the focal plane, the effective beam appears as a plane wave. Within around 5 wavelengths from the focal plane, the phase surfaces are closer together than would be expected for a plane wave travelling along the optical axis. However, as the size of the detection volume (which may be defined as the volume of coincidence of the detection optical path with the illumination optical path) is typically of the order of millimetres in length, this region of unusual phase variation near to the focal plane constitutes only a small volumetric fraction of $((5 \times 633 \text{ nm})/1 \text{ mm}) \sim 3 \times 10^{-3}$ and can therefore be considered negligible for practical purposes.

However, in some embodiments a model may be used to correct for any deviation of the effective beam from a plane wave when determining particle characteristics. For example, an appropriately altered refractive index may be assigned to the region of deviation (i.e. within 5-6 wavelengths of the focal plane).

The transverse extent of the central lobe 145, along the axis of the focal plane v, may be calculated using $$v = \frac{2\pi}{\lambda}\left(\frac{\alpha}{f}\right)|r| \qquad (9)$$

where $r=(x^2+y^2)^{0.5}$ in the focal plane v, and so for a 100 mm focal length lens, 10 mm in diameter, illuminating light of wavelength 633 nm, then for $v=\pi$ (i.e. the point along the focal plane with a phase differing by it from the central maximum), $|r|=3.5$ μm.

This is a relatively small size for the detection optical path 142 to explore. However, treating the detection path as equivalent to a detection beam (shown by the dotted lines in FIG. 14A), the beam waist at the focus of a laser of diameter $x_{laser}$ incident on a lens of focal length f=100 mm, in a medium of refractive index n (=1.33 for water) is given by $$x_{focus} = \frac{\lambda f}{n\pi x_{laser}}.\qquad(10)$$

Thus the size of the beam at the lens required to detect a region within the radius of 3.5 µm would be $x_{laser}$=(633 nm×100 mm)/(1.33×π×3.5 µm)=4.3 mm. This beam size is readily achievable, demonstrating that it is possible to detect scatter from the central lobe in FIG. 14A. A high quality, best form, or doublet lens may be used to reduce imaging aberrations which may degrade the image in the region of the focal plane.

Even if the detection path explores regions beyond the central lobe, for example if the equivalent detection beam is broader than the one shown in FIG. 14A, or light at angles of less than 10° is detected, the illuminating effective beam will still sufficiently approximate a plane wave. As shown in FIG. 14B, the effective beam exhibits phase discontinuities. However, the phase wave-fronts will be travelling through the sample at the local speed of light. Hence, in a dispersant of refractive index, n and taking the phase ø=kx, where k=2π/λ, then for a discontinuity of π radians, x=π/2, and δt=x/(c/n)=633 nm×1.33/(c×2)~1.4×10$^{-16}$ s. In other words, each discontinuity will pass through the detection region on a timescale of ~10$^{-16}$ s. This timescale is too fast for a conventional detector to detect, and so the discontinuities will not significantly affect the signal measured by the detector. For example, if an autocorrelation detection scheme is used to detect the signal, a single detector cannot detect events faster than its dead-time. Since a typical, modern, avalanche photo-diode detector has a dead-time of 12.5 ns, the discontinuities in the phase front cannot be detected and the field behaves as if it were a forward travelling plane wave for most of the detected volume, except the negligible region, within 5 to 6 wavelengths of the focal plane, as already discussed.

Cross-correlation detection schemes, on the other hand, are able to correlate to zero-time since the dead-time is uncorrelated between two or more detectors. However, at the timescale calculated above it is unlikely that enough photons would be captured in order to correlate effectively without an excessively high input laser power. Such a high input power laser may cause unwanted Joule heating at the focus, and for high enough powers may cause non-linear optical effects in both the dispersant and the dispersed phases.

Therefore the effective waves generated by the optical elements in the above example particle characterisation instruments approximate plane waves. To all practically detectable purposes, the sample is illuminated as if by a conventional plane wave, but with the advantage of allowing detection of zero- and π-scattered light.

Other embodiments are intentionally within the scope of the invention as defined by the appended claims.

The invention claimed is:

1. A particle characterisation instrument configured to perform dynamic light scattering measurements and/or static light scattering measurements, comprising:
   a light source configured to create a light beam;
   a sample carrier defining a sample position;
   an optical element between the light source and sample carrier, the optical element configured to receive the light beam from the light source and to modify the light beam to create a modified beam, the modified beam:
   a) interfering with itself to create an effective beam at the sample position along an illumination axis; and
   b) diverging in the far field to produce a dark region along the illumination axis that is substantially not illuminated at a distance from the sample cell;
   a detector, at the distance from the sample cell, configured to detect light scattered from the effective beam by a sample in the sample cell, the detector positioned to detect forward or back scattered light along a defined scattering axis that is at an angle of 0° to 10° from the illumination axis.

2. The particle characterisation instrument of claim 1, wherein the sample carrier is a sample cell, and the modified beam interferes with itself to create an effective beam in the sample cell along the illumination axis.

3. The instrument of claim 1, wherein the detector is a first detector positioned to detect forward scattered light, and further comprising a second detector positioned to detect back scattered light.

4. The instrument of claim 1, wherein the detector comprises an active detector area, and wherein the active detector area is located entirely within the dark region.

5. The instrument of claim 1, wherein the effective beam approximates a Bessel beam.

6. The instrument of claim 1, wherein the optical element is an axicon lens.

7. The instrument of claim 1, wherein the optical element is an obscured lens, the lens comprising a light-blocking obscuration at its centre.

8. The instrument of claim 7, wherein the detector, or a second detector, is positioned to detect back scattered light and forms the light-blocking obscuration.

9. The instrument of claim 7, wherein the lens comprises an aperture through its centre and the detector, or a second detector, is positioned to detect back scattered light and is positioned within the aperture.

10. The instrument of claim 1, wherein the optical element comprises:
    a beam splitter configured to split light from the light source into a first portion and a second portion; and
    at least one lens positioned to receive the first portion and the second portion, and wherein the at least one lens is configured to direct the first portion and the second portion onto the sample cell.

11. The instrument of claim 10, wherein a lens is positioned to receive both portions of the light from the light source, and the lens is configured to direct both portions of light onto the sample cell, wherein the lens is optionally positioned such that the first portion and second portion are incident at opposing positions on the lens relative to the centre of the lens.

12. The instrument of claim 1, wherein the sample carrier comprises a droplet surface for holding a droplet of liquid sample, or wherein the sample carrier comprises a cuvette.

13. The instrument of claim 1, further comprising a light deflecting element configured to deflect light scattered along the scattering axis to the detector.

14. The instrument of claim 13, wherein the optical element, sample carrier and light deflecting element are supported on a body, the body optionally configured to be received in an optical instrument comprising the light source and the detector.

15. The instrument of claim 1, further comprising an additional detector configured to detect light scattered from the effective beam by a sample at the sample position, the additional detector positioned to detect scattered light along a defined scattering axis that is at an angle of 85° to 95° from the illumination axis.

16. A method of characterising particles dispersed in a sample using dynamic light scattering, the method comprising:
placing the sample on or in a sample carrier;
using a light source to produce an illumination beam;
modifying the illumination beam using an optical element placed between the light source and the sample, the optical element configured to receive the illumination beam from the light source and to modify the illumination beam to create a modified beam, the modified beam interfering with itself to create an effective beam in the sample along an illumination axis and diverging in the far field to produce a dark region along the illumination axis that is substantially not illuminated at a distance from the sample;
detecting light that is forward or back scattered from the sample along a defined scattering axis that is at an angle of 0° to 10° from the illumination axis with a detector placed at the distance from the sample.

17. An optical assembly comprising:
a body, receivable in a cuvette holder, configured to support or house a liquid sample;
an optical element attached to the body and between the body and a light source, configured to modify light from the light source to create a modified beam, the modified beam: a) interfering with itself to create an effective beam in the body propagating along an illumination axis and b) diverging in the far field to produce a dark region along the illumination axis that is substantially not illuminated at a distance from the body.

18. The optical assembly of claim 17, wherein the body is configured to house a liquid sample and allow illuminating light from outside the body to communicate with the sample and scattered light to communicate from the sample to outside the body.

19. The assembly of claim 17, further comprising a light deflecting element attached to the body and positioned in the dark region, the light deflecting element configured to divert light scattered from the liquid sample in the direction of the illumination axis along an axis that is at a non-zero angle to the illumination axis.

20. A non-transitory machine readable medium comprising a computer program configured to operate an optical instrument, the instrument comprising a light source for illuminating a sample position along an illumination axis and a detector configured to detect light scattered away from the illumination axis by a sample at the sample position;
wherein the computer program is configured to determine if an optical assembly according to claim 17 is present in the instrument, and wherein:
if the program determines that the optical assembly is not present, to operate in a first mode for performing an off-axis scattering measurement; and
if the program determines that the optical assembly is present, to operate in a second mode for performing a zero-angle scattering measurement.

21. The machine readable medium of claim 20, wherein the computer program is configured to calculate a physical property of the sample.

22. The machine readable medium of claim 21, wherein the physical property comprises a particle size.

* * * * *